(12) United States Patent
Oguchi

(10) Patent No.: US 8,744,447 B2
(45) Date of Patent: Jun. 3, 2014

(54) METHOD, APPARATUS, AND SYSTEM FOR WIRELESS CONNECTION

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 532 days.

(21) Appl. No.: 13/028,403

(22) Filed: Feb. 16, 2011

(65) Prior Publication Data

US 2011/0243003 A1    Oct. 6, 2011

(30) Foreign Application Priority Data

Mar. 31, 2010   (JP) .................................. 2010-084163

(51) Int. Cl.
*H04W 36/00* (2009.01)

(52) U.S. Cl.
USPC ............ 455/437; 370/252; 370/329; 455/436

(58) Field of Classification Search
CPC ...... H04L 43/00; H04B 17/00; H04B 17/003; H04W 88/06; H04W 72/04; H04W 76/00; H04W 36/18; H04W 36/0011; H04W 36/14; H04W 36/08; H04W 36/24; H04W 36/30
USPC ................. 370/241, 252, 328, 329, 331, 332; 455/422.1, 436, 437
See application file for complete search history.

(56) References Cited

U.S. PATENT DOCUMENTS

| | | | | |
|---|---|---|---|---|
| 7,123,618 | B2 * | 10/2006 | Ido et al. ........................ | 370/394 |
| 7,751,803 | B2 | 7/2010 | Vialen et al. | |
| 7,881,714 | B2 * | 2/2011 | Ho et al. ........................ | 455/423 |
| 2001/0018342 | A1 * | 8/2001 | Vialen et al. .................. | 455/423 |
| 2005/0021818 | A1 * | 1/2005 | Singhal et al. ................ | 709/232 |
| 2006/0014526 | A1 * | 1/2006 | Cherian ..................... | 455/412.1 |
| 2008/0074994 | A1 | 3/2008 | Jen | |
| 2008/0076404 | A1 | 3/2008 | Jen | |
| 2008/0076405 | A1 | 3/2008 | Jen | |
| 2008/0165750 | A1 | 7/2008 | Kim | |

FOREIGN PATENT DOCUMENTS

| | | |
|---|---|---|
| JP | 2001-268617 | 9/2001 |
| JP | 2001-275168 | 10/2001 |
| JP | 2007-251662 | 9/2007 |
| JP | 2007251662 A * | 9/2007 |
| JP | 2008-79313 | 4/2008 |
| JP | 2008-182697 | 8/2008 |
| JP | 2009-260821 | 11/2009 |
| WO | 2008/082266 | 7/2008 |

OTHER PUBLICATIONS

Notification of Reason(s) for Refusal dated Jun. 4, 2013, from corresponding Japanese Application No. 2010-084163.
Notification of Reason(s) for Refusal dated Sep. 3, 2013, from corresponding Japanese Application No. 2010-084163.

* cited by examiner

*Primary Examiner* — Chi Pham
*Assistant Examiner* — Weibin Huang
(74) *Attorney, Agent, or Firm* — Katten Muchin Rosenman LLP

(57) ABSTRACT

A wireless connecting method includes a connection monitoring step, a connection parameter retaining step, and a connection restoring step. The connection monitoring step monitors the wireless connection between the communication terminal device and the base station. The connection parameter retaining step sets a communication session retention time period that is longer than a connection parameter retention time period, and retains a connection parameter. A connection parameter when the wireless connection is disconnected is retained in at least one of the communication terminal device and the base station for the communication session retention time period exceeding the connection parameter retention time period. The connection restoring step executes, after the connection parameter retention time period has elapsed, when the communication session retention time period has not elapsed, an initial connecting process and restores the connection using the connection parameter stored when the wireless connection is disconnected.

18 Claims, 38 Drawing Sheets

SESSION TIMEOUT VALUE TABLE

| PORT NUMBER | COMMUNICATION APPLICATION | UPPER LAYER SESSION TIMER VALUE |
|---|---|---|
| 20 | FTP Control | 60 [SEC] |
| 2049 | NFS | 60 [SEC] |
|  |  |  |

128  130  132

118

SESSION MONITORING TABLE

| PROTOCOL | PORT NUMBER | UPPER LAYER SESSION DISCONNECTION MONITORING TIMER VALUE | AGING TIMER |
|---|---|---|---|
| TCP | 21 | 60 [SEC] | 65 [SEC] |
| TCP | 20 | 30 [SEC] | 35 [SEC] |

160  162  164  166

120

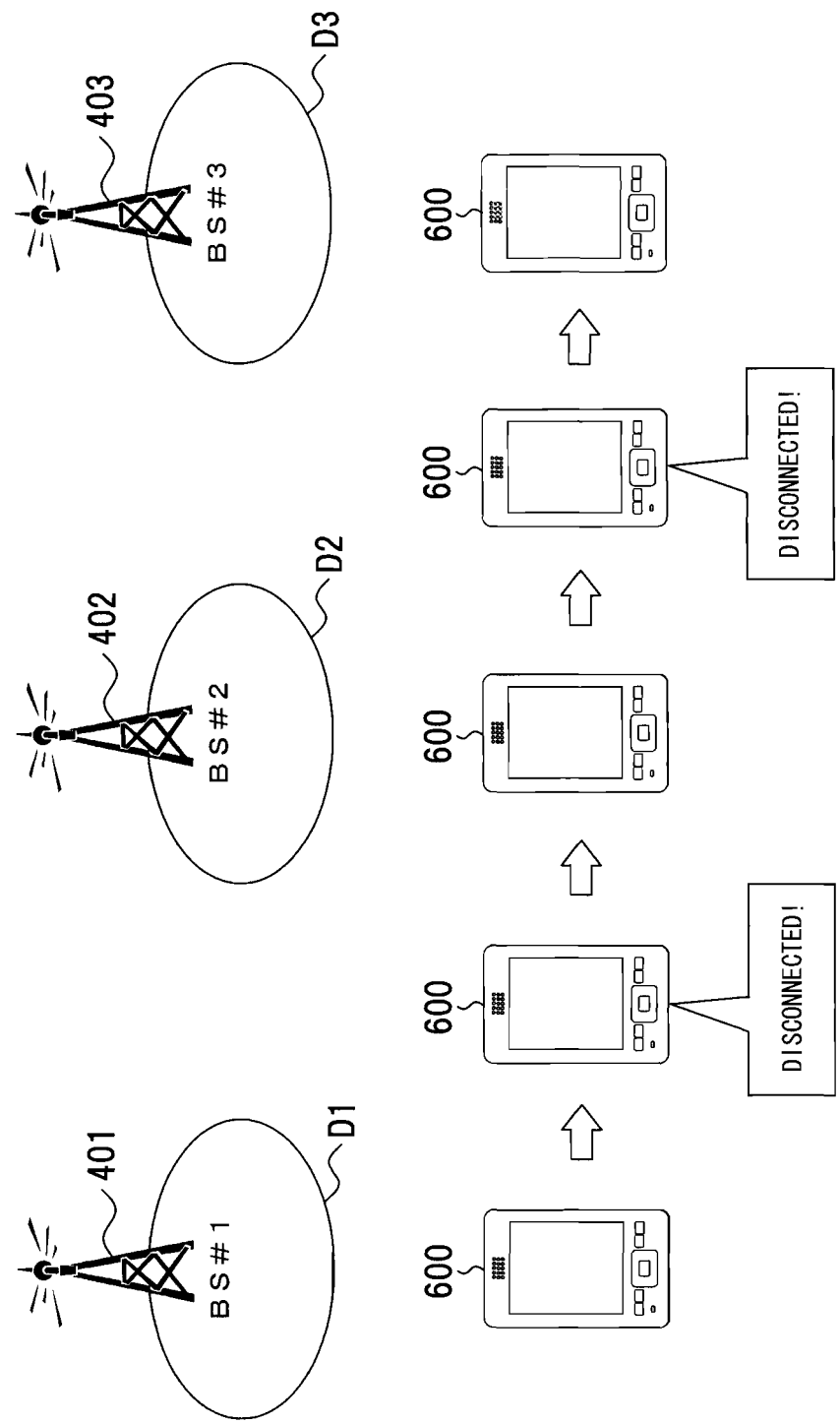

METHOD, APPARATUS, AND SYSTEM FOR WIRELESS CONNECTION

CROSS-REFERENCE TO RELATED APPLICATIONS

This application is based upon and claims the benefit of priority of the prior Japanese Patent Application No. 2010-084163, filed on Mar. 31, 2010, the entire contents of which are incorporated herein by reference.

FIELD

The embodiments discussed herein are related to technology such as connection control of a wireless link between a base station and a communication terminal device like a mobile terminal device.

BACKGROUND

As to wireless communication between a base station and a communication terminal device, at a time immediately after the start of the service, etc., in a wireless access network whose base stations are not yet sufficiently installed or in a service area having a low coverage on the population therein, the communication states of the communication terminal device in and out of a service area repeatedly alternate. As a result, a connection state and a disconnection state of a link layer often repeatedly alternate.

In an operation system (OS) operating on a personal computer (PC), etc., that includes a communicating function, an up and a down states of a logical interface (IF) alternate depending on a connection or a disconnection of the link layer. When the state of the logical IF transitions to the down state, all sockets opened toward the logical IF are closed and this closure seems to be a communication error of an application. Thereafter, even when the link layer is again connected and the state of the logical IF has transitioned to the up state, a procedure for a reconnection may be complicated.

As to such a wireless connection, it is known that: it is checked whether any service is being received when a time period set in an idle timer driven in an active mode has expired; and the active mode transitions to a virtual idol mode when a service is being received (Japanese Laid-Open Patent Publication No. 2008-182697).

SUMMARY

According to an aspect of the embodiments, a wireless connecting method is a wireless connecting method to connect by wireless a communication terminal device with a base station, and includes a connection monitoring step, a connection parameter retaining step, and a connection restoring step. The connection monitoring step monitors the wireless connection between the communication terminal device and the base station.

The connection parameter retaining step sets a communication session retention time period is set that is longer than a connection parameter retention time period and retains a connection parameter. The connection parameter retention time period is a time period during which the connection parameter for the wireless connection is retained and a reconnecting process is executable. A connection parameter when the wireless connection is disconnected is retained in at least one of the communication terminal device and the base station for the communication session retention time period exceeding the connection parameter retention time period.

The connection restoring step executes an initial connecting process after the connection parameter retention time period has elapsed and when the communication session retention time period has not elapsed, and restores the connection using the connection parameter retained when the connection is disconnected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 38 is a diagram of an operation of a communication system of a comparative example.

DESCRIPTION OF EMBODIMENTS

As described previously, a wireless connection between a base station and a communication terminal device is introduced. The communication terminal device may have the communication disconnection due to a timeout of a communication protocol of a layer that is upper than a network layer. However, the time period to reach the disconnection is relatively long. Therefore, when the communication that temporarily is aborted can be restarted by the time of the timeout, the communication can continuously be maintained using a retransmitting process by the upper layer.

However, when the time period to retain a connection parameter of the communication terminal device becomes long in the base station, the base station may secure many resources such as the connection parameter for the elongated time period. This leads to an increase of the cost.

When the base station shortens the time period to retain the connection parameter, a logical IF can be easily disconnected though the communication terminal device can continuously use an upper layer protocol in the communication terminal device. This leads to waste.

Preferred embodiments of the present invention will be explained with reference to accompanying drawings.

[a] First Embodiment

A first embodiment relates to a method, an apparatus, and a system for wireless connection disclosed herein, and is adapted to retain a connection parameter in a communication terminal device when a wireless connection (wireless link) between the communication terminal device and a base station is disconnected, and restore the connection using the connection parameter. The base station is hereinafter referred to as "BS". The communication terminal device may be a mobile terminal device that is assumed to move around such as a portable terminal device or may be a fixedly installed terminal device. The communication terminal device is a mobile station as an example and is hereinafter referred to as "MS".

Figure 1:
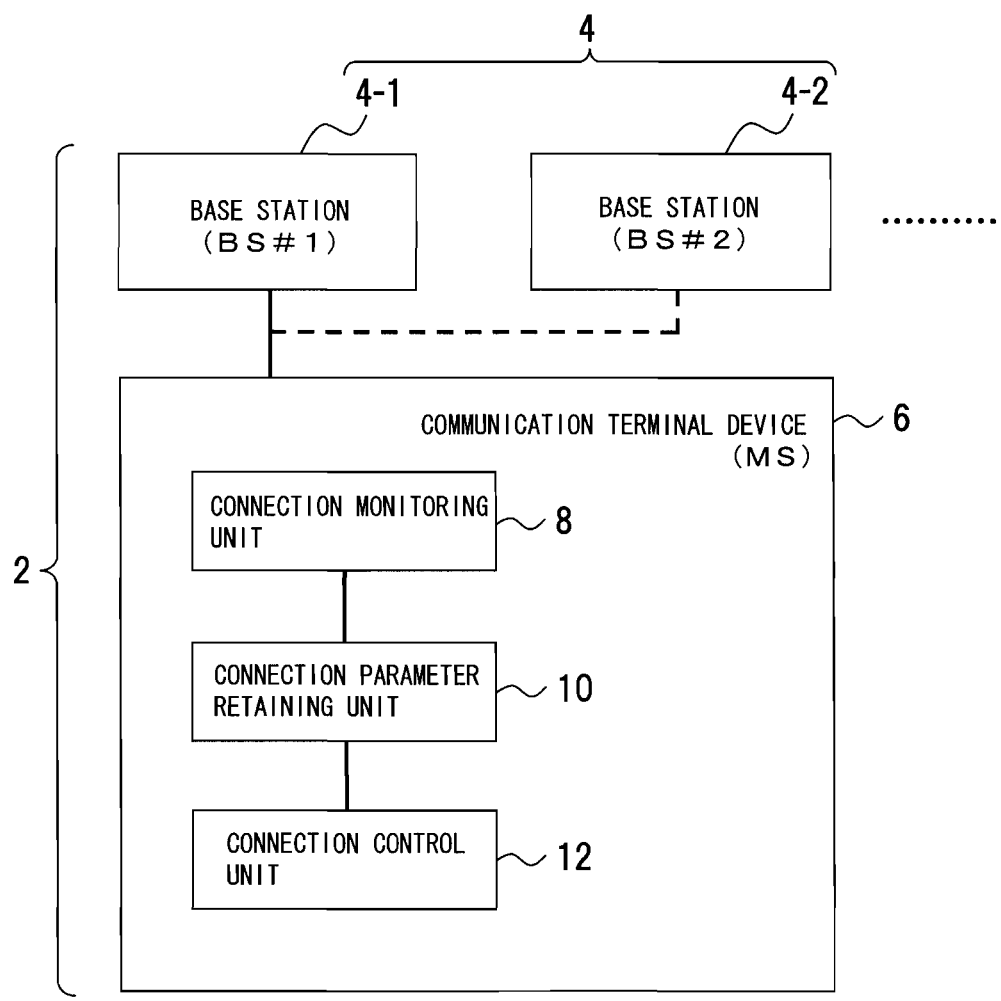
FIG. 1 is a diagram of an exemplary configuration of a communication system according to a first embodiment.

The first embodiment will be described with reference to FIG. 1. FIG. 1 is a diagram of an example of a communication network.

This communication network 2 is an example of the method, the apparatus, and the system for the wireless communication disclosed herein. The communication network 2 is adapted to realize a wireless link utilizing a wireless medium such as a radio wave and, as depicted in FIG. 1, includes a plurality of BSs (base stations) 4-1 (#1), 4-2 (#2), . . . , and at least one MS (communication terminal device) 6. The BSs 4-1 (#1), 4-2 (#2), . . . , and the MS 6 each configure a wireless communicating apparatus and each are an example of the wireless connecting apparatus disclosed herein.

The MS 6 includes a connection monitoring unit 8, a connection parameter retaining unit 10, and a connection control unit 12. The connection monitoring unit 8 is a functional unit that monitors the wireless connection between the base station and the communication terminal device, and monitors whether the wireless connection is maintained or disconnected.

The connection parameter retaining unit 10 acquires a connection parameter retained when the wireless connection is disconnected, in response to the result of the monitoring on the connection by the connection monitoring unit 8, and retains the connection parameter. A connection parameter retention time period $T_1$ is set in the BS 4 during which the connection parameter for the wireless connection is retained and a reconnecting process can be executed. Therefore, a communication session retention time period $T_2$ ($>T_1$) that is longer than the connection parameter retention time period $T_1$ is set and the connection parameter retained when the connection is disconnected is retained until the communication session retention time period $T_2$ expires. The connection parameter is retained until the communication session retention time period $T_2$ expires after the expiration of the connection parameter retention time period $T_1$. A memory may be used for this retention of the connection parameter.

When the wireless connection is disconnected, the connection control unit 12 executes a reconnecting process (a) or an initial connecting process (b) for, for example, the BS 4-1(#1) that has been connected to the MS 6.

(a) Reconnecting process: this reconnecting process is executed when a time period T from the time when the wireless connection is disconnected is within the connection parameter retention time period $T_1$. The MS 6 executes the reconnecting process for the BS 4-1. The wireless connection is restored by the reconnecting process.

(b) Initial connecting process: this initial connecting process is executed instead of the reconnecting process when the time period T from the time when the wireless connection is disconnected exceeds the connection parameter retention time period $T_1$. The MS 6 executes the initial connecting process for the BS 4-1. In the initial connecting process, the connection parameter is used that has been retained by the connection parameter retaining unit 10 at the time when the wireless connection is disconnected. The "connection parameter retention time period $T_1$" is a time period during which a base station retains the connection parameter. The connection parameter retaining unit 10 retains the connection parameter for a time period that is longer than the connection parameter retention time period $T_1$, that is, the communication session retention time period $T_2$. Therefore, after the time period T from the time when the wireless connection is disconnected exceeds the connection parameter retention time period $T_1$, the initial connecting process is executed and, thereby, the connection is restored using the connection parameter retained when the connection is disconnected.

Figure 2:
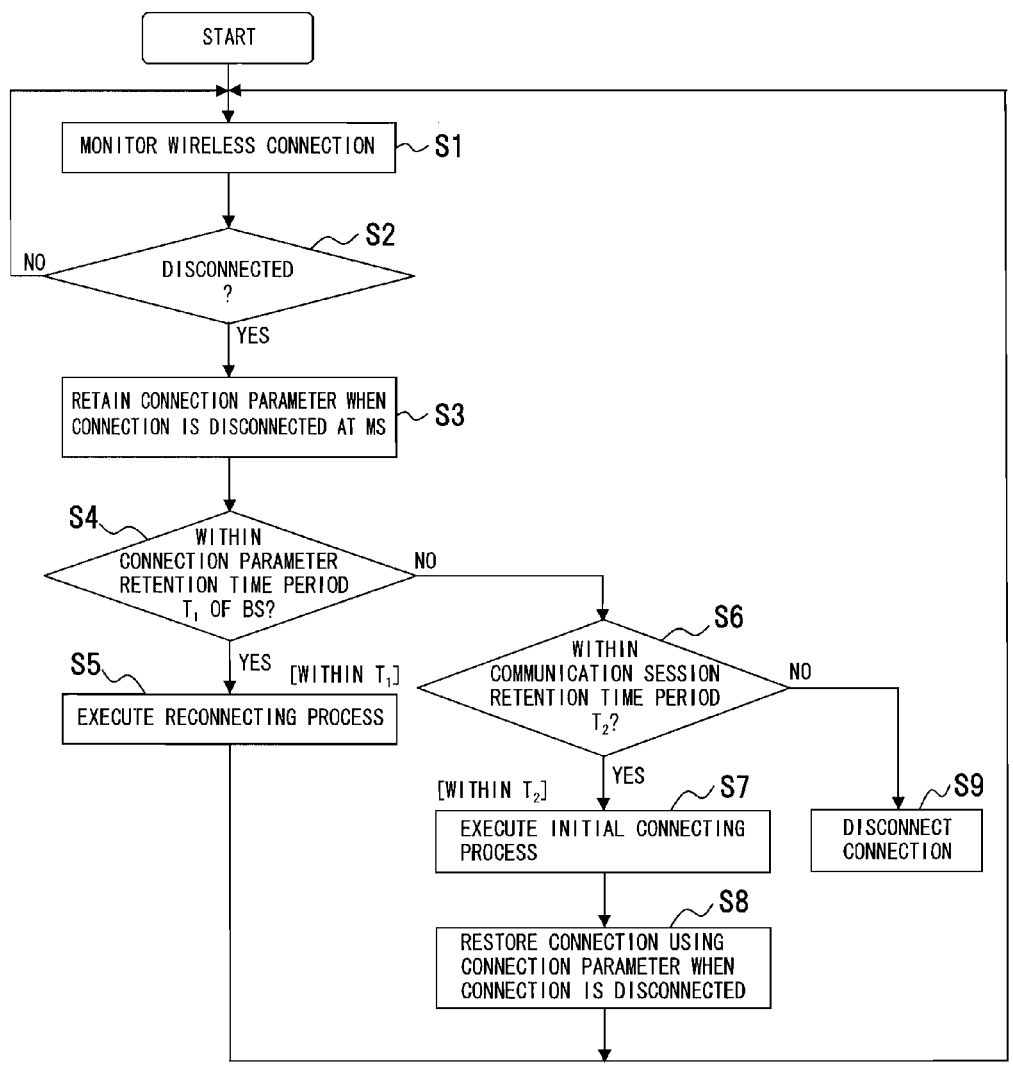
FIG. 2 is a flowchart of an example of a process procedure for a wireless connection.

This connecting process will be described with reference to FIG. 2. FIG. 2 is a flowchart of an example of a process procedure for the wireless connection.

The connecting process is an example of a method for a wireless connection. As depicted in FIG. 2, when the BS 4-1 (#1) is connected to the MS 6 by wireless, the MS 6 monitors the wireless connection (step S1). The monitoring on the wireless connection is executed to monitor whether the wireless link is disconnected (step S2). When it is monitored that the wireless connection is not disconnected (NO of step S2), the monitoring on the wireless connection is continuously executed (step S1).

When it is monitored that the wireless connection is disconnected (YES of step S2), the MS 6 retains a connection parameter retained when the connection is disconnected (step S3).

The above time period T is measured from the time of the disconnection of the wireless connection. When a connectable BS is found, it is determined whether the time period T is within the time period during which the BS 4-1 (#1) retains the connection parameter, that is, the connection parameter retention time period $T_1$ (step S4).

When it is determined that the time period T is within the connection parameter retention time period $T_1$ (YES of step S4), the reconnecting process is executed (step S5). When the reconnection can be completed, the procedure returns to step S1.

When it is determined that the time period T exceeds the connection parameter retention time period $T_1$ (NO of step S4), it is determined whether the time period T is within the communication session retention time period $T_2$ (step S6).

When it is determined that the time period T is within the communication session retention time period $T_2$ (YES of step S6), the initial connecting process is executed (step S7). In the initial connecting process, the connection is restored using the connection parameter that has been retained in the MS 6 when the connection is disconnected (step S8). When the connection can be restored, the procedure returns to step S1.

When it is determined that the time period T is not within the communication session retention time period $T_2$ (NO of step S6), it is determined that the connection is disconnected (step S9). In this case, the connecting process is newly started. In this connecting process, the connection parameter is not used that has been retained in the MS 6 when the connection is disconnected.

According to the above configurations and processes, the following advantages are achieved.

(1) When the connection parameter retention time period $T_1$ has not elapsed, the reconnecting process can be executed and, when the connection parameter retention time period $T_1$ has elapsed, the initial connecting process is executed and, thereby, the connection can be restored using the connection parameter retained when the connection is disconnected. Therefore, the wireless connecting function of each of the BS and the MS is enhanced.

(2) The connection parameter stored when the connection is disconnected is retained by the MS 6 and is used in the reconnection. Therefore, expediting of the connecting process is facilitated.

(3) The connection parameter stored when the connection is disconnected is retained by the MS 6. Therefore, the load of retaining resources on the BS is reduced.

Though the MS 6 retains the connection parameter within the communication session retention time period $T_2$ in the embodiment, the retention is not limited to the above. The BS 4 may realize the same functions, that is, the functions executed by the connection monitoring unit 8, the connection parameter retaining unit 10, and the connection control unit 12 and, thereby, the same effects are also acquired.

[b] Second Embodiment

A second embodiment is an example of the method, the apparatus, and the system for a wireless connection disclosed herein, and is adapted to retain the connection parameter in the MS within the communication session retention time period and restore the connection. In the embodiment, the connection parameter retention time period $T_1$ is a resource retention time period and the communication session retention time period $T_2$ is an upper layer session retention time period.

Figure 3:
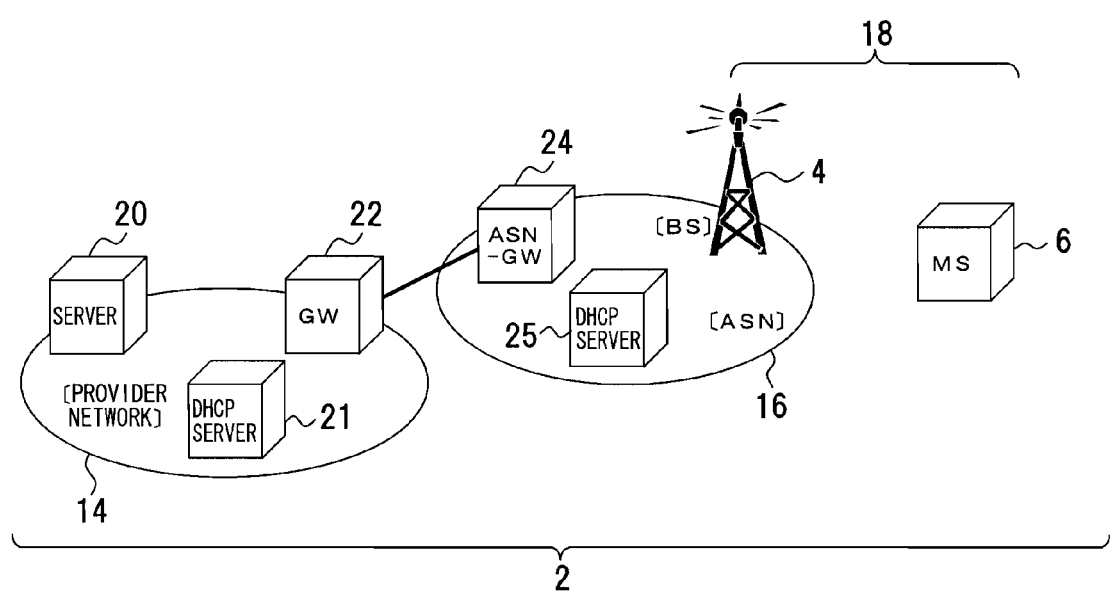
FIG. 3 is a diagram of an example of a communication system according to a second embodiment.

The second embodiment will be described with reference to FIG. 3. FIG. 3 is a diagram of an example of a communication network. In FIG. 3, the same components as those in FIG. 1 are given the same reference numerals.

Though the communication network 2 is the example of the method, the apparatus, and the system for the wireless communication disclosed herein as above, the embodiment further includes a first network 14, a second network 16, and a wireless connection area 18. The network 14 is, for example, a network of an Internet service provider, and includes a server 20, a DHCP (Dynamic Host Configuration Protocol) server 21, and a gateway apparatus (GW) 22. The server 20 is a computer that includes a communicating function. The DHCP server 21 is a server that automatically provides connection information such as an IP (Internet Protocol) address, and is configured by a computer that includes a communicating function. The GW 22 is a connecting means to connect to an ASN (Access Service Network)-gateway apparatus (GW) 24 that configures a base station control apparatus in the network 16. The GW 22 is also a relaying apparatus.

The network 16 is, for example, an access service network and includes the BS 4, the ASN-GW 24, and a DHCP server 25. The BS 4 is connected to the ASN-GW 24 through the network 16, and is also connected to the ASN-GW 24, the GW 22, and the server 20 through the network 14. The DHCP server 25 is as above a server that automatically provides connection information such as an IP address and is configured by a computer that includes a communicating function.

The wireless connection area 18 is an area to execute wireless connection through a communication medium such as a radio wave. The MS 6 is connected to the BS 4 by wireless through this wireless connection area 18.

For example, assuming a network of WiMAX (WiMAX: Worldwide Interoperability of Microwave Access) as a mobile network for the communication network 2, the BS 4 and the MS 6 execute the communication based on the specification of a predetermined standard (for example, IEEE 802.16e-2005). In this case, through a WiMAX communication carrier (ASN), the MS 6 executes the communication with the server 20 in the network 14 through the wireless connection area 18 and the networks 16 and 14.

According to the above specification, a communication module mounted on the MS 6 has a specific address (for example, 88:00:01:A0:01:12) as a MAC (Media Access Control) address of the MS 6. A WiMAX communication carrier (ASN) is a wireless access network that is configured by a plurality of devices such as the ASN-GW 24 and the BS 4. The BS 4 has a specific ID (for example, 0x0A0B01). The server 20 that is present in the network 14 is connected to the network 14, the GW 22, and the ASN-GW 24 and executes communication with the MS 6 through the BS 4. The server 20 has a specific IP address (for example, 133.160.1.50).

Figure 4:
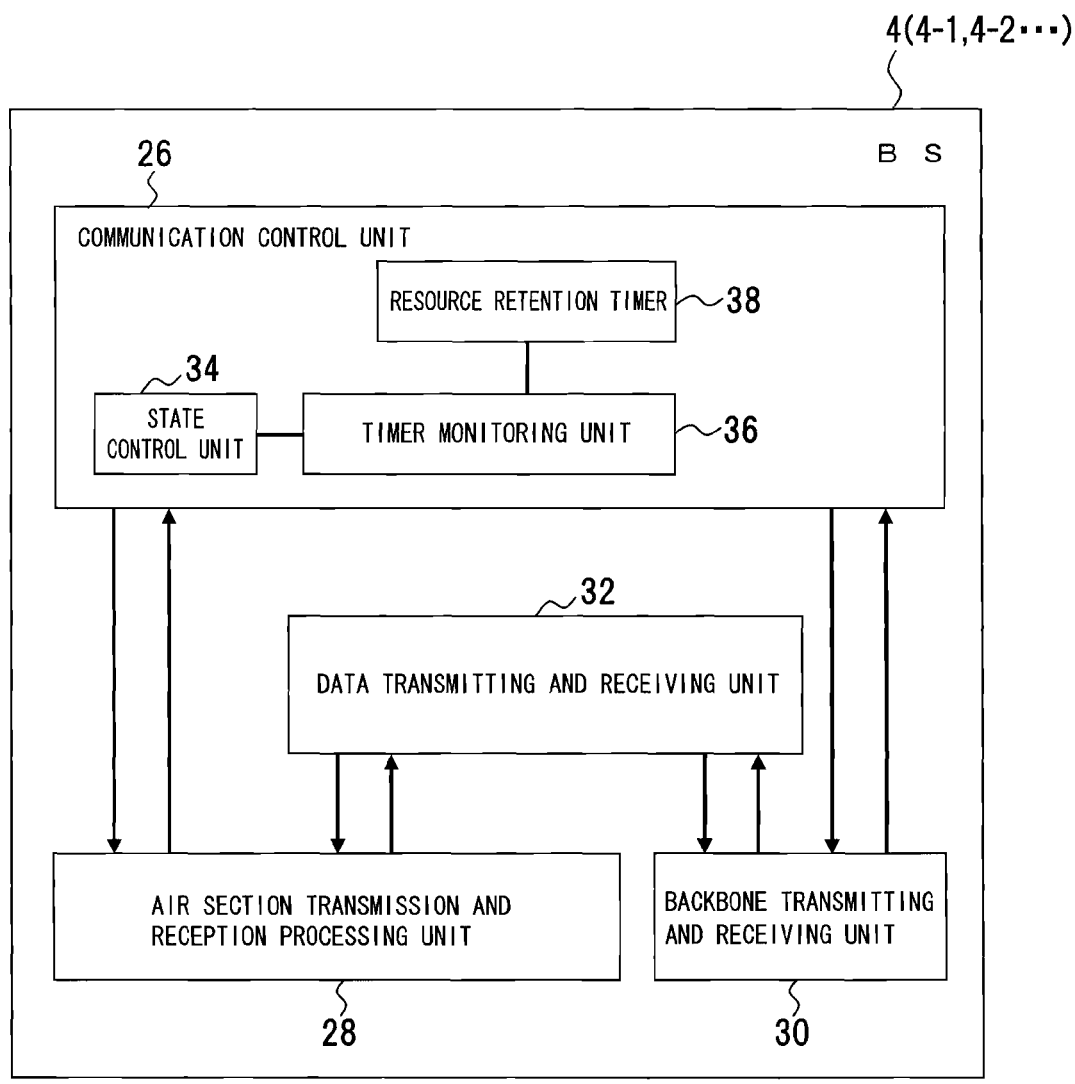
FIG. 4 is a diagram of an exemplary configuration of a base station (BS)

A BS (Base Station) will be described with reference to FIG. 4. FIG. 4 is a diagram of an exemplary configuration of the base station. The configuration depicted in FIG. 4 is an example, and the wireless connecting apparatus and the wireless connection system that are disclosed herein are not limited to the configuration. In FIG. 4, the same components as those in FIG. 3 are given the same reference numerals.

The BS 4 is an example of the wireless connecting apparatus, is a relaying means between the MS 6 and the server 20, and executes a connection using the wireless connection area 18 and a connection to the server 20 using the networks 14 and 16. To realize these connections, the BS 4 includes a communication control unit 26, an air section transmission and reception processing unit 28, a backbone transmitting and receiving unit 30, and a data transmitting and receiving unit 32.

The communication control unit 26 is an example of a control unit and is a functional unit that exchanges control messages with the MS 6 and that maintains and controls the communication of the MS 6. The communication control unit 26 transmits a message to the MS 6 using the air section transmission and reception processing unit 28, and receives a control message from the MS 6, from the air section transmission and reception processing unit 28 that has received the control message. The backbone transmitting and receiving unit 30 executes communication with the ASN-GW 24 that is the base station control apparatus.

The air section transmission and reception processing unit 28 converts various messages to be transmitted to the MS 6 into radio waves and transmits the radio waves to the MS 6, takes out a message from a radio wave received from the MS 6, and supplies the message to the functional units such as the communication control unit 26 and the data transmitting and receiving unit 32.

The backbone transmitting and receiving unit 30 is a functional unit that executes transmitting and receiving processes for the BS 4 to exchange messages with the ASN-GW 24 (FIG. 3) and another BS such as, for example, the BS 4-2 through the backbone network.

The communication control unit 26 includes a state control unit 34, a timer monitoring unit 36, and a resource retention timer 38.

The state control unit 34 is a functional unit that manages the connection state with the MS 6. The connection states that the state control unit 34 manages include:

(a) non-connection state;
(b) connection state;
(c) the state where the connection is disconnected while the BS 4 retains resources; and
(d) the state where the connection is disconnected and, thereafter, a session of an application in the MS 6 continues even when a resource retention time period of the BS 4 has expired.

The timer monitoring unit 36 starts up and monitors various timers such as the resource retention timer 38, corresponding to the state managed by the state control unit 34. The timer monitoring unit 36 notifies the state control unit 34 of an event that represents a timeout when the timer monitoring unit 36 detects a timeout of a timer such as the resource retention timer 38 that the timer monitoring unit 36 monitors.

The resource retention timer 38 is a timer that defines a time period during which the connection parameter that has been exchanged in the initial connection procedure is retained when the MS 6 is connected to the BS 4. This connection parameter retention time period is a time period during which the connection parameter is retained after the BS 4 detects an abortion of the communication with the MS 6, and is determined by the resource retention timer 38. The connection parameter is referred to as, for example, "context" and is connection information used in the connection.

Figure 5:
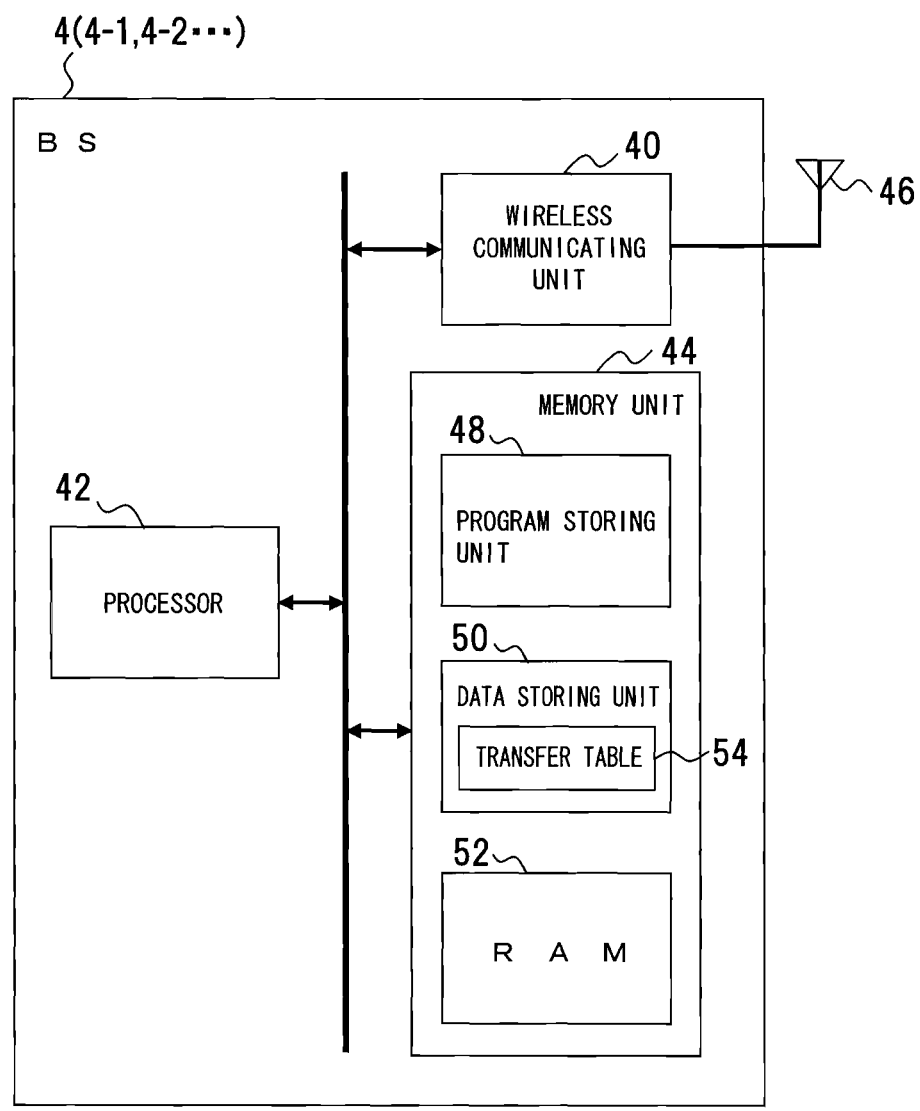
FIG. 5 is a diagram of an exemplary configuration of hardware of the base station.

The BS 4 includes a hardware configuration to realize the functional units. As depicted in FIG. 5, the hardware configuration may include at least, for example, a wireless communicating unit 40, a processor 42, and a memory unit 44.

The wireless communicating unit 40 is an example of the hardware that is controlled by the processor 42 and that realizes the function of the air section transmission and reception processing unit 28, includes an antenna 46, and is a means to communicate with the MS 6 by wireless.

The processor 42 is an example of the hardware that executes an OS (Operating System) and the communicating application in the memory unit 44, and that controls the wireless communication, transmission and reception of data, etc., with the MS 6.

The memory unit 44 includes a program storing unit 48, a data storing unit 50, and a RAM (Random-Access Memory) 52. The program storing unit 48 has stored therein various programs such as the OS and the communication application program. The data storing unit 50 is an example of the connection parameter retaining unit and has stored therein various kinds of control data such as the connection parameters used for the connection with the MS 6. A transfer table 54 is provided in the data storing unit 50. The transfer table 54 is a table that determines whether the control message that the BS is received from the MS is transferred to the above base station control apparatus or not. The RAM 52 configures a working area for program processing.

Figure 6:
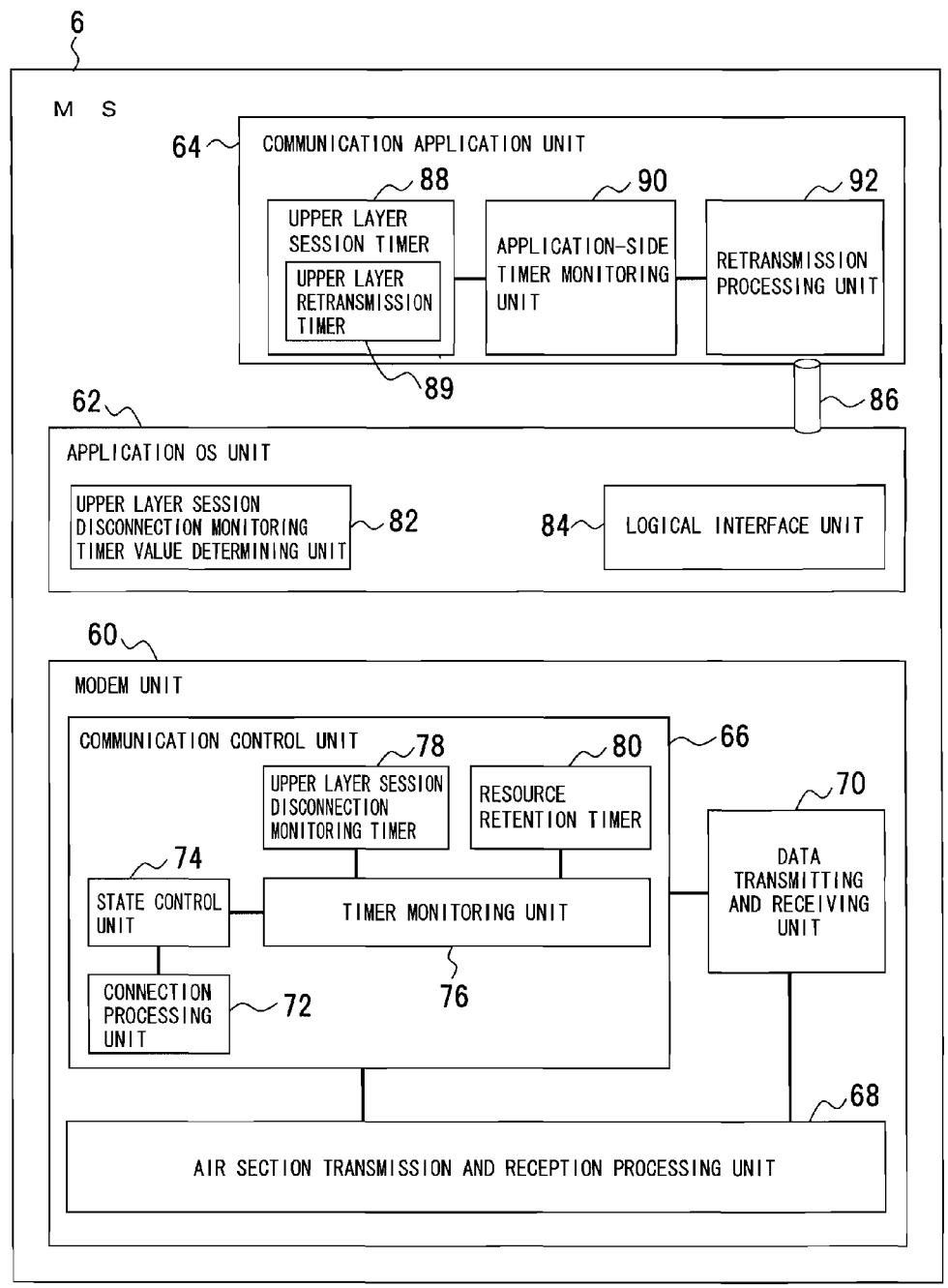
FIG. 6 is a diagram of an exemplary configuration of a communication terminal device (MS)

The MS (communication terminal device) will be described with reference to FIG. 6. FIG. 6 is a diagram of an example of functional units of the communication terminal device. The configuration depicted in FIG. 6 is an example, and the wireless connecting apparatus and the wireless connection system that are disclosed herein are not limited to the configuration. In FIG. 6, the same components as those in FIG. 1 are given the same reference numerals.

The MS 6 is an example of the method, the apparatus, and the system for the wireless connection that are disclosed herein and, as depicted in FIG. 6, includes a modem unit 60, an application OS unit 62, and a communication application unit 64.

The modem unit 60 is a communication module that is added to a communication terminal platform for the application OS unit 62 and the communication application unit 64 to operate thereon. The modem unit 60 includes a communication control unit 66, an air section transmission and reception processing unit 68, and a data transmitting and receiving unit 70.

The communication control unit 66 is an example of the connection control unit 12 and is a functional unit that exchanges control messages with the BS 4 and that maintains and controls the communication with the BS 4. The communication control unit 66 transmits a message to the air section transmission and reception processing unit 68, and receives the control message from the BS 4, from the air section transmission and reception processing unit 68 that has received the control message.

The communication control unit 66 includes a connection processing unit 72, a state control unit 74, a timer monitoring unit 76, an upper layer session disconnection monitoring timer 78, and a resource retention timer 80. The connection processing unit 72 is a functional unit that executes an initial connection procedure (Initial Network Entry) and a reentry procedure (Re-entry) as a reconnecting process for handing over, for the BS 4 according to instructions from the state control unit 74. The connection processing unit 72 is also a functional unit that executes an operation for restoring the session that has continued until a disconnection to realize the connecting method disclosed herein.

The state control unit 74 is an example of the connection monitoring unit 8 and is a functional unit that manages the state of the connection with the BS 4. The connection states managed by the state control unit 74 include, as above: (a) the non-connection state; (b) the connection state; (c) the state where the connection is disconnected while the BS 4 retains the resources; and (d) the state where the connection is disconnected and, thereafter, a session with the BS 4 continues even when the resource retention time period of the BS 4 has expired.

The timer monitoring unit 76 is a functional unit that starts up and monitors various timers such as a timer corresponding to the state managed by the state control unit 74, and monitors a timeout of each of the upper layer session disconnection monitoring timer 78 and the resource retention timer 80. When the timer monitoring unit 76 detects a timeout, the timer monitoring unit 76 notifies the state control unit 74 of an event that represents the timeout.

The upper layer session disconnection monitoring timer 78 is a timer in the modem unit 60 that monitors an upper layer session retention time period, and is also a timer that monitors a maintenance time period during which a non-communication state is maintained of a communication session managed by the application OS unit 62 and the communication application unit 64 that are in the upper layer. The time length of a timer may, for example, be acquired from the upper layer or determined by analyzing a header of a data packet included in messages that are transmitted and received by the modem unit 60.

The resource retention timer 80 is a timer that defines a time period during which the connection parameter (context) is retained that is exchanged in the initial connecting procedure executed when the MS 6 is connected to the BS 4. The retention time period of the context is a time period during which the context is retained after the BS 4 detects an abortion of the communication with the MS 6, and this retention time period is determined by the resource retention timer 80.

The data transmitting and receiving unit 70 is a functional unit that creates a service flow for the wireless communication carrier and that executes creation of a transmission frame and expansion of a reception frame.

The air section transmission and reception processing unit 68 is a functional unit that synchronizes with a frame from the BS 4 preset in advance and that transmits and receives the frame to/from a wireless medium.

The application OS unit 62 is a functional unit that causes the communication application unit 64 in the terminal platform to operate and that supplies connectivity to the communication application unit 64 using the modem unit 60. The application OS unit 62 includes an upper layer session disconnection monitoring timer value determining unit 82 and the logical interface unit 84. A communication port 86 is opened between the application OS unit 62 and the communication application unit 64.

The upper layer session disconnection monitoring timer value determining unit 82 is a functional unit that monitors any abortion of the communication of a communication session, that detects a time period from an abortion of the communication to abandonment of the session, and that notifies of this time period. The upper layer session disconnection monitoring timer value determining unit 82 is operated using the communication application or the OS and, when the communication of a communication session opened by the communication application has been aborted, detects the time period before abandoning the session. The time period detected is notified of from the upper layer session disconnection monitoring timer value determining unit 82 to the state control unit 74 of the modem unit 60.

The logical interface unit 84 configures a virtual interface in the network layer for the application OS unit 62 and the communication application unit 64 to identify the modem unit 60 and transmit and receive data thereto/from.

The communication port 86 is a socket as a connecting means that is opened by the communication application for the OS.

The communication application unit 64 is an application that executes communication with counterpart communicating apparatuses that are communication counterparts in the networks 14 and 16 using the communication protocol supplied by the application OS unit 62. The communication application unit 64 includes an upper layer session timer 88, an application-side timer monitoring unit 90, and a retransmission processing unit 92.

The upper layer session timer 88 is an example of a time counting means that sets a time period during which a communication session opened is usable, and may also be disposed on the application OS unit 62. The upper layer session timer 88 includes an upper layer retransmission timer 89. The upper layer retransmission timer 89 is an example of a functional unit that monitors the time period from detection of a communication abortion state to abandonment of a session. The upper layer retransmission timer 89 monitors a timeout time period (=retransmission timeout time period) spanning to the time when a response to the message transmitted from the BS 4 is received and, therefore, the upper layer session timer 88 may also monitor a time period that is determined by multiplying the timeout time period (=retransmission timeout time period) spanning to the time when the response to the message transmitted from the BS 4 is received by the number of retrials.

The application-side timer monitoring unit 90 is a functional unit that monitors the time counted by the upper layer session timer 88. The application-side timer monitoring unit 90 may be disposed on the application OS unit 62.

The retransmission processing unit 92 is a functional unit that retransmits a message when no expected response is returned to the message transmitted as a response by the communication application unit 64. This functional unit may also be disposed on the application OS unit 62.

Figure 7:
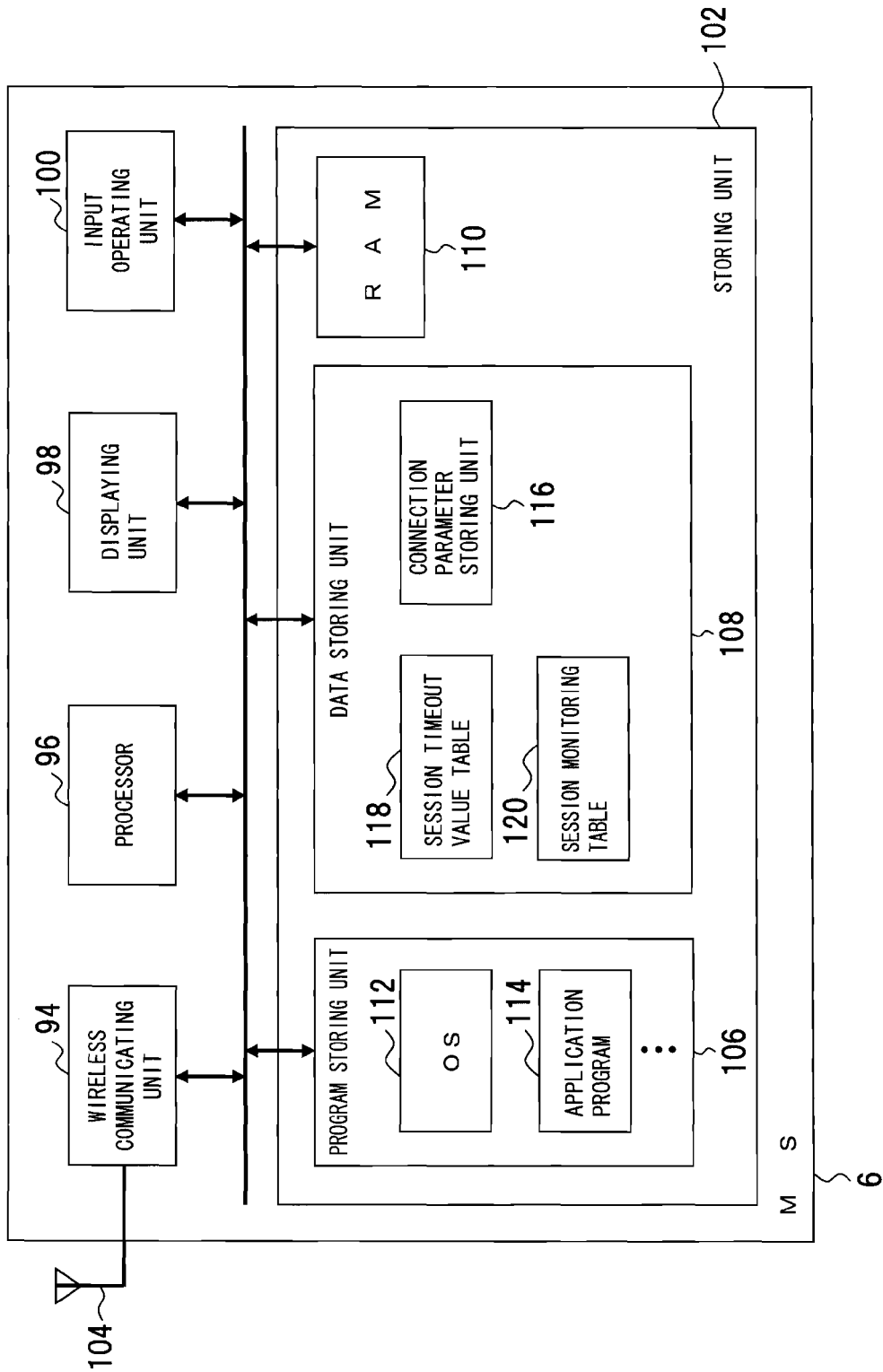
FIG. 7 is a diagram of an exemplary configuration of hardware of the communication terminal device.
Figure 8:
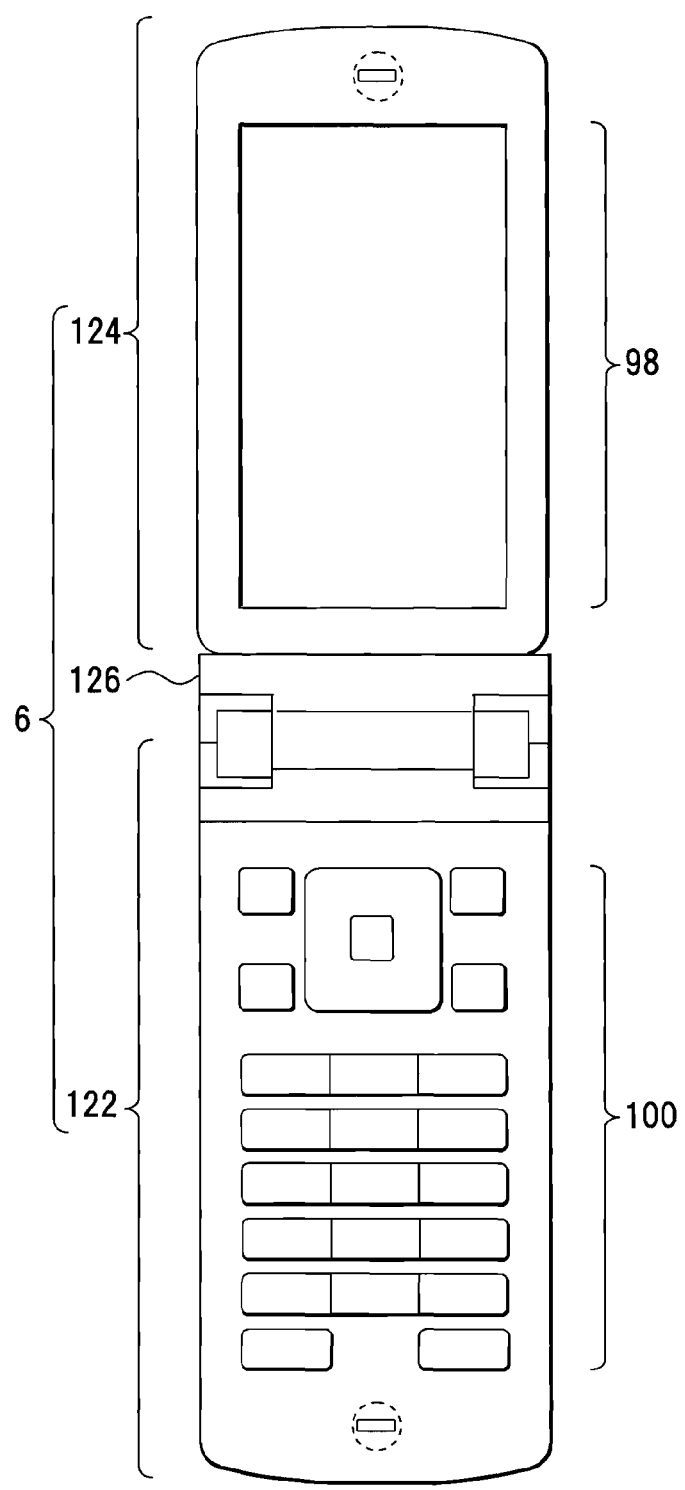
FIG. 8 is a diagram of an exemplary configuration of the communication terminal device.

Hardware of the MS will be described with reference to FIGS. 7 and 8. FIG. 7 is a diagram of an exemplary configuration of the hardware of the communication terminal device. FIG. 8 is a diagram of an exemplary configuration of the communication terminal device. In FIGS. 7 and 8, the same components as those in FIGS. 1 and 6 are given the same reference numerals.

As depicted in FIG. 7, the MS 6 includes a wireless communicating unit 94, a processor 96, a displaying unit 98, an input operating unit 100, and a storing unit 102 as hardware means that realize the above functions.

The wireless communicating unit 94 includes an antenna 104 and is connected by wireless using, for example, a radio wave to the BS 4 according to control of the processor 96. The wireless communicating unit 94 and the processor 96 configure the modem unit 60, etc.

The processor 96 is a means of executing programs and application programs in the storing unit 102, executing the reconnecting process and the initial connecting process as the above functions, and executing control of the restoration of the connection, etc. The processor 96 configures the application OS unit 62, the communication application unit 64, and the communication port 86.

The displaying unit 98 is an example of, for example, an information presenting means of presenting a message, etc., that represent the content of the control executed during the communication. The presentation of information may be executed using a message that visually appeals or may be a message that auditorily appeals. Therefore, the displaying unit 98 is not limited to a unit for visual displaying.

The input operating unit 100 is an example of an interface that accepts necessary information triggered by an operation by a user.

The storing unit 102 may include a program storing unit 106, a data storing unit 108, and a RAM 110.

The program storing unit 106 has stored therein, for example, an OS 112 and an application program 114 as the various programs executed by the processor 96.

The data storing unit 108 is a means of having stored therein and retaining various kinds of data such as the connection parameter and the session timeout value, and includes storing units such as a connection parameter storing unit 116, a session timeout value table 118, and a session monitoring table 120. The connection parameter storing unit 116 is an example of the connection parameter retaining unit and has stored therein the connection parameter retained when the wireless connection is disconnected. The session timeout value table 118 has stored therein, for example, a session timeout value as threshold value data to execute an operation for a session timeout. The session monitoring table 120 has stored therein session monitoring data as information to create an event that occurs when the wireless connection is disconnected. The RAM 110 configures a working area for the processing.

As depicted in FIG. 8, the MS 6 is configured to be foldable by a first housing unit 122 and second housing unit 124 using a hinging unit 126. The housing unit 122 is, for example, an operation-side housing and includes the input operating unit 100 that includes character keys and cursor keys. The housing unit 124 is, for example, a display-side housing and includes the displaying unit 98. The housing units 122 and 124 include hardware such as the wireless communicating unit 94, the processor 96, the storing unit 102, and a circuit board.

Processes executed for the wireless connection and its disconnection in the embodiment will be described. The connecting process is executed in three cases that are, first, restoration of the connection within the connection parameter retention time period, second, restoration of the connection within the upper layer session retention time period, and third, impossible restoration.

(1) Restoration of the connection within the connection parameter retention time period (reconnection): This is the case where the MS 6 can find a new BS 4 (for example, the BS 4-2) within the time period during which the connection parameter of the MS 6 is retained by the BS 4 (for example, the BS 4-1), and can reconnect the MS 6 to the new BS 4.

(2) Restoration of the connection within the upper layer session retention time period (reconnection): This is the case where the MS 6 can not find any new BS within the retention time period of the connection parameter of the MS 6 by the BS 4 (for example, the BS 4-1) while the MS 6 can find a new BS 4 (for example, the BS 4-2) before the upper layer session is disconnected, and can reconnect to the new BS 4.

(3) Impossible restoration: This is the case where connection is impossible and where no BS 4 to be connected is found.

(1) Process Executed for Restoration of Connection within Connection Parameter Retention Time Period (Reconnection)

Figure 9:
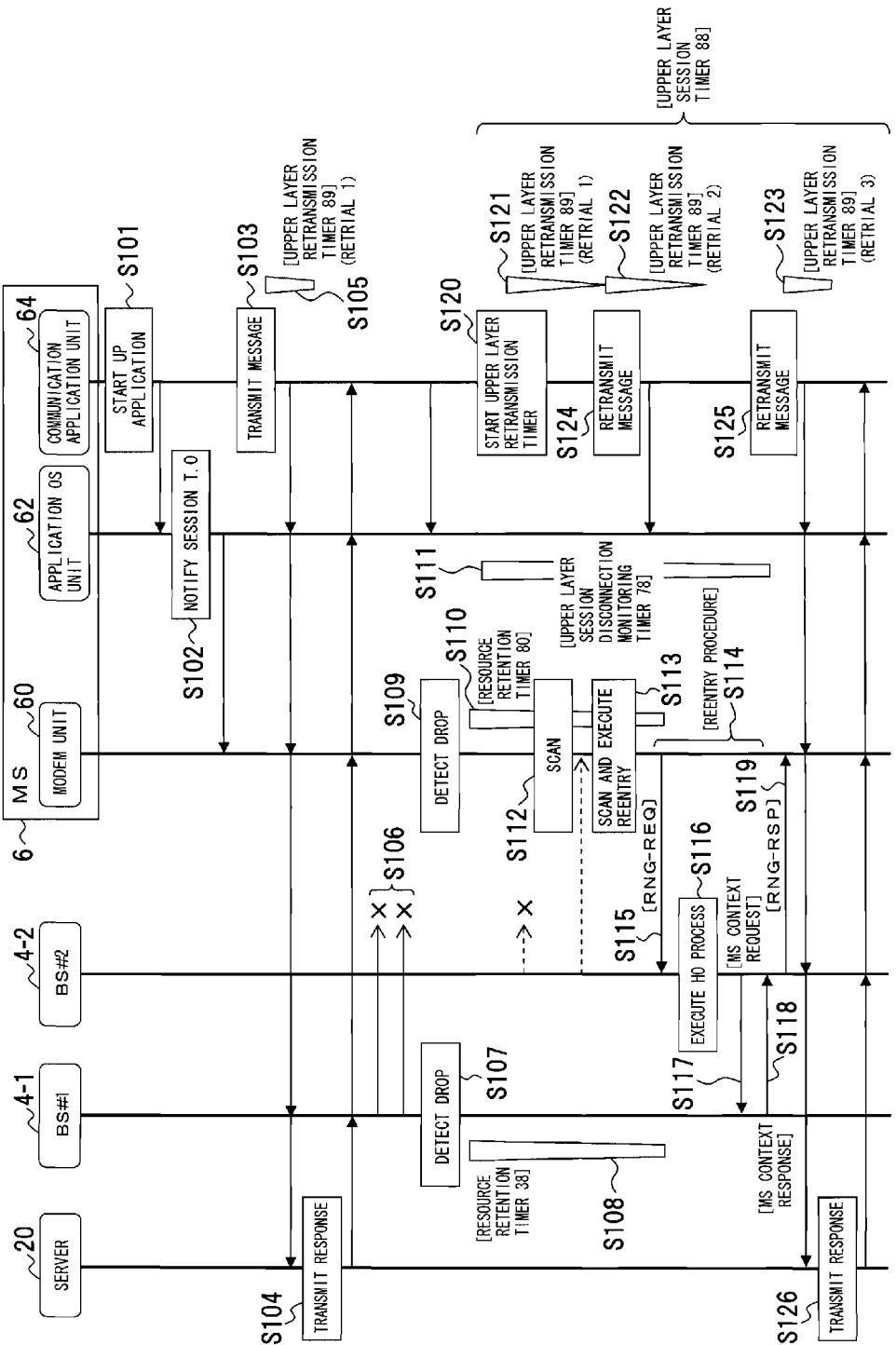
FIG. 9 is a flowchart of an example of a process procedure for the wireless connection.

The process executed for restoration of the connection within the connection parameter retention time period will be described with reference to FIG. 9. FIG. 9 is a diagram of an operation sequence executed when the connection can be restored within the connection parameter retention time period.

In starting up of the application (step S101), prior to the start of the communication with the server 20, the communication application unit 64 opens a socket in the application OS unit 62 and gives a port number to this socket. A specific port number may be used for this port number.

Figure 10:
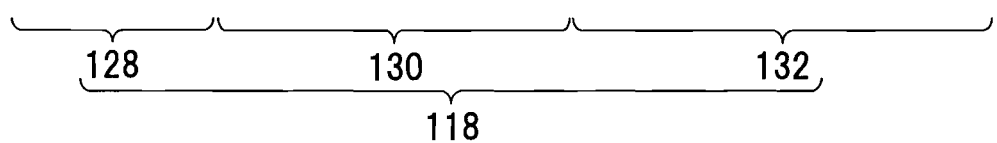
FIG. 10 is a diagram of an example of a session timeout value table.

The application OS unit 62 determines an upper layer session timeout time period (T. O) that is specific to the application, based on the communication port number, and notifies the communication control unit 66 of the modem unit 60, of the result of detection of the session T. O, the kind of application, or the protocol (step S102). In this case, an addressed port that (for example, that of a port number 20: FIG. 10) indicates a control session under FTP (File Transfer Protocol) and, therefore, the application OS unit 62 determines a predetermined value that is, for example, 60 [sec] as an upper layer session timeout time period (for example, an upper layer session timer value: FIG. 10) that is determined in advance.

In this case, the communication application unit 64 starts transmission of a message (step S103). The message is notified of from the modem unit 60 to the BS 4-1 through the application OS unit 62 and arrives at the server 20 from the BS 4-1. When the server 20 receives the message transmitted, transmission of a response is executed (step S104). The message of the transmitted response is transferred to the BS 4-1, arrives at the modem unit 60 from the BS 4-1, and is transferred to the communication application unit 64 through the application OS unit 62.

In this case, when an application with the retransmission function is used, a time period acquired by repeating a timeout time period to wait for a response for the number of retrials may be used as the upper layer session timeout time period. The case may be present where the application has no retransmission using a specific timer and, therefore, when TCP (Transmission Control Protocol) is used, the time period acquired by repeating a retransmission timer time period in a TCP layer for the number of retrials may be used as the upper layer session timeout time period. The application OS unit 62 notifies the communication control unit 66 of the modem unit 60, of the upper layer session timeout time period (step S102). The modem unit 60 may refer to the port number included in each of messages that are transmitted and received, thereby, identify the communication application unit 64, and identify the upper layer session timeout time period.

The communication application unit 64 can transmit and receive data to/from the server 20 during the time period during which the MS 6 is connected to the BS 4-1(#1) (steps S103 and S104). In this case, the communication application unit 64 synchronizes with the transmission of a message (step S103) and counting by the upper layer retransmission timer 89 is started and, when the message transmitted as a response arrives within a predetermined time period, the counting by the upper layer retransmission timer 89 is stopped (step S105).

At this time, it is assumed that the MS 6 does not receive the transmission radio wave of the BS 4-1(#1). When a time period continues (for example, for 600 [ms]) during which a DL-MAP (Downlink Map) message of the BS 4-1(#1) is not received, the modem unit 60 determines that the connection with the BS 4-1(#1) is disconnected ("drop"). The DL-MAP message is one of MAC management messages and is information on downlink wireless resource allocation. Triggered by this disconnection, the resource retention timers 38 and 80, and the upper layer session disconnection monitoring timer 78 are started (steps S108, S110, and S111). The resource retention timers 38 and 80 each count a time period during which the connection parameter of the MS 6 is retained by the BS 4-1 since the BS 4-1 has detected the drop of the MS 6 (connection parameter retention time period). When the MS 6 can be reconnected to the BS 4-1 within this time period by executing the procedure for handing over (HO), the communication can be restarted from the state before the disconnection. As above, the upper layer session disconnection monitoring timer 78 is a timer that monitors the time when a communication session of the upper layer application detects a timeout.

When the wireless connection is disconnected (step S106), the BS 4-1 detects the drop (step S107) and, triggered by this detection of the drop, the resource retention timer 38 starts counting (step S108).

When the wireless connection is disconnected, the modem unit 60 detects the drop (step S109) and the resource retention timer 80 starts counting (step S110). At this time, the upper layer session disconnection monitoring timer 78 starts counting (step S111).

The MS 6 scans the BS 4 that is connectable within the resource retention time period (step S112). This "scanning" refers to trying to decode a signal by synchronizing with the transmission frequency of the BS 4. It is assumed that finding a BS to be connected is failed in the scanning (step S112) while the BS 4-2(#2) is found in scanning (step S113). In this case, the resource retention time period has not expired and, therefore, the communication control unit 66 of the modem unit 60 executes a reconnection procedure (reentry procedure) that is referred to as "Network Re-entry" for the BS 4-2(#2) (step S114). More specifically, the communication control unit 66 transmits a message that is referred to as "ranging request (RNG-REQ)" (step S115). The BS 4-2(#2) receives the message and executes the handing over process (step S116). More specifically: the context of the MS 6 (the connection parameter of the MS 6) is requested through the backbone network to the BS 4-1(#1) that the MS 6 has been connected to (step S117); the context is received through the backbone network (step S118); and the BS 4-2 transmits an RNG-RSP (Ranging Response) message to the MS 6 (step S119). The "ranging" is a process to establish the synchronization between a base station and a communication terminal device in terms of the time and the frequency. The "RNG-REQ" is a request for this process and the "RNG-RSP" is a response to this request.

During the counting by the upper layer session disconnection monitoring timer 78 of the modem unit 60, the communication application unit 64 causes the upper layer retransmission timer 89 to start counting (step S120). In this case, during the counting by the upper layer session disconnection monitoring timer 78, a plurality of trial sessions by the upper layer retransmission timer 89 are enabled. In this case, the counting by the upper layer retransmission timer 89 is executed from a retrial 1 to a retrial 3 (steps S121, S122, and S123). In this case, during the retrial 3, the wireless connection is restored and the counting for the retrial 3 by the upper layer retransmission timer 89 is stopped (step S123).

In this case, during the counting for the retrial by the upper layer retransmission timer 89, "message retransmission" is issued (step S124) and is notified of to the application OS unit 62. During the counting by the upper layer session disconnection monitoring timer 78 (step S111), the modem unit 60 is executing the scanning processes (steps S112 and S113) and the reentry procedure (step S114). Therefore, no message is retransmitted from the application OS unit 62.

When the RNG-RSP message arrives at the modem unit (step S119), "message retransmission" (step S125) is executed from the communication application unit 64. The modem unit 60 notifies the BS 4-2 of the message received and also notifies the server 20 of the message. When the server 20 receives the message, the server 20 executes transmission of a response (step S126). A message transmitted as this response is transferred to the BS 4-2, arrives at the modem unit 60 from the BS 4-2, and is transferred to the communication application unit 64 through the application OS unit 62. Therefore, the restoration of the connection has been executed within the connection parameter retention time period.

As above, the communication application unit 64 retransmits the message and, thereby, the message transmitted as the response is received from the server 20 and the counting by the upper layer session disconnection monitoring timer 78 is stopped. Thereby, the upper layer application can continuously use the communication session.

The timeout value of the communication application will be described with reference to FIG. 10. FIG. 10 is a diagram of an example of the session timeout value table.

The session timeout value table 118 has set therein a port number storing unit 128, a communication application storing unit 130, and an upper layer session timer value storing unit 132 and each of these units has stored therein data. Therefore, an upper layer session timer value is determined based on a port number and a communication application. For example, when the port number is "20" and the communication application is "FTP control (File Transfer Protocol Control)", for example, 60 [sec] is set as a specific time that represents the upper layer session timer value. In this case, the FTP is a protocol that is used for transferring files. "NFS (Network File System)" is information to access a network.

(2) Process Executed for Restoration of Connection within Upper Layer Session Retention Time Period (Reconnection)

Figure 11:
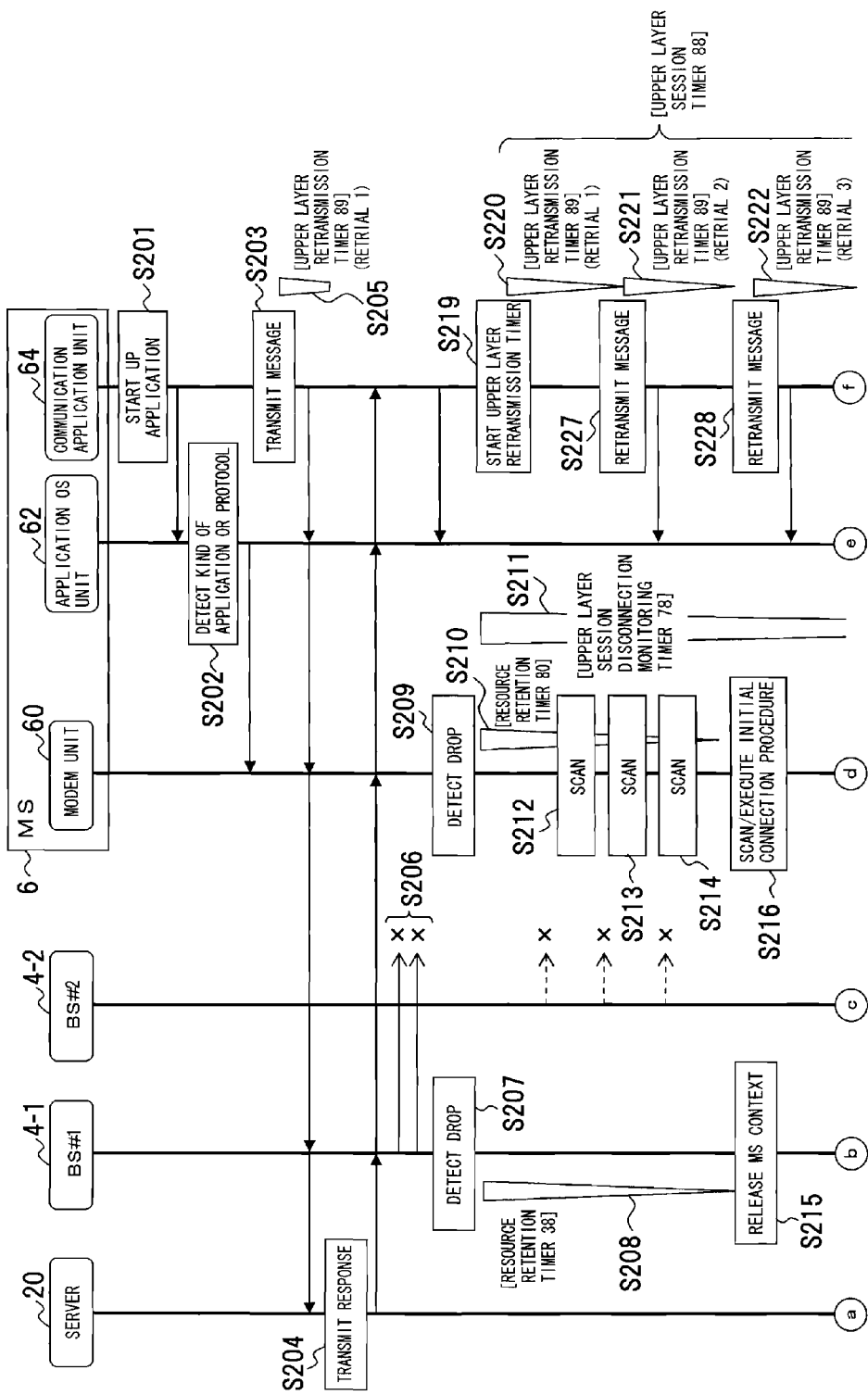
FIG. 11 is a diagram of an operation sequence executed when recovery is successfully completed by an upper layer session timeout after the connection parameter retention time period has elapsed.
Figure 12:
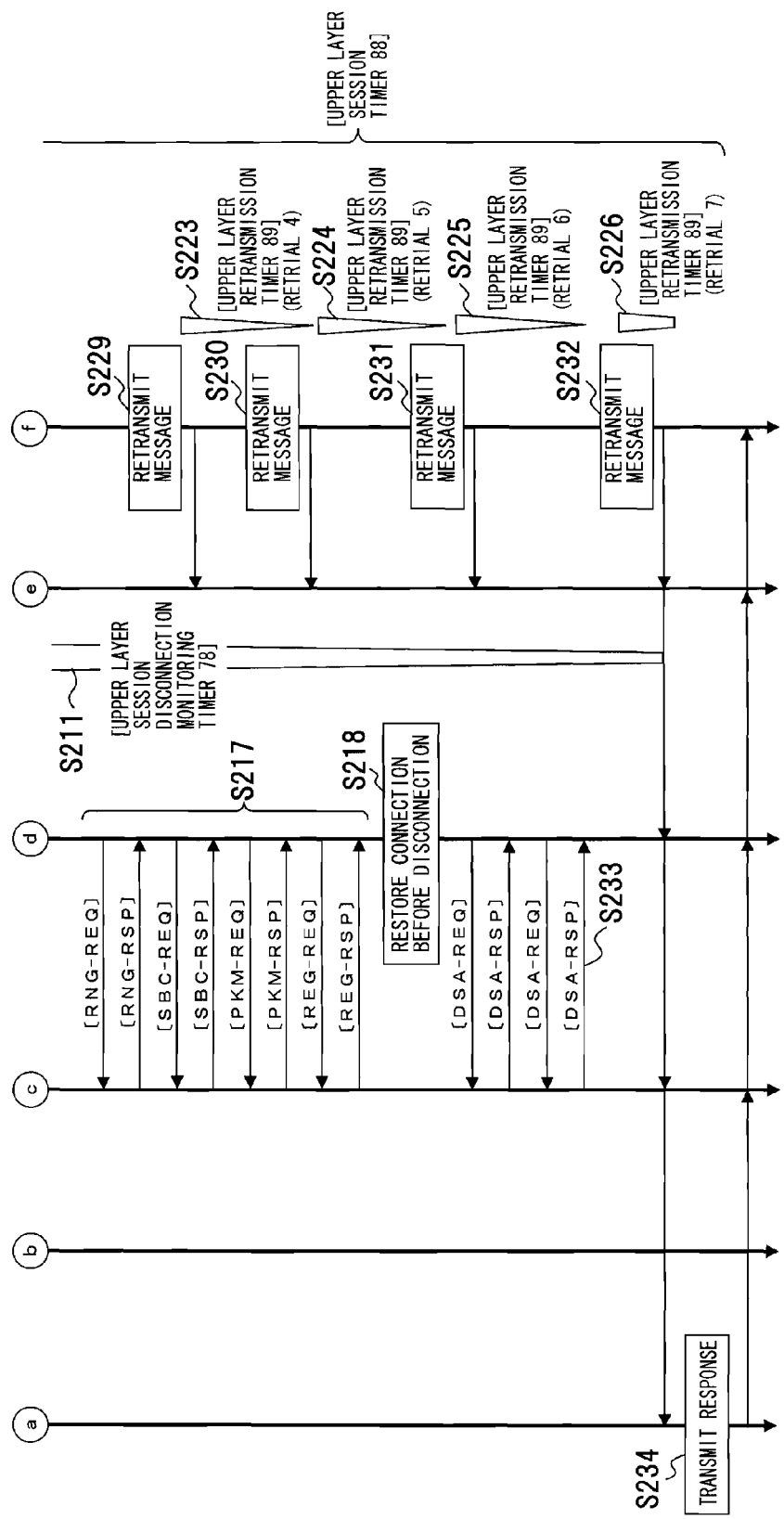
FIG. 12 is a diagram of an operation sequence executed when the recovery is successfully completed by the upper layer session timeout after the connection parameter retention time period has elapsed.

The process executed for restoration of the connection within the upper layer session retention time period will be described with reference to FIGS. 11 and 12. FIGS. 11 and 12 are diagrams of an operation sequence executed when the connection can be restored by the upper layer session timeout after the connection parameter retention time period has expired. In FIGS. 11 and 12, each of "a" to "f" denotes a connecting portion between flowcharts.

This process includes a connecting process (steps S201 to S212) and the connecting process is same as the connecting process (steps S101 to S112), that is, the restoration of the connection within the connection parameter retention time period, and will not again be described.

The restoring process is executed in the case where, in executing the connection restoring process within the connection parameter retention time period of (1): the BS 4-2(#2) is not found; no BS to be connected to is found even by executing further scanning; and the counting of each of the resource retention timers 38 and 80 expires.

In the restoring process, the scanning is also repeatedly executed to find a connectable BS within the time period by the resource retention timer 80 (steps S212 to S214). When the time period by the resource retention timer 38 has expired, an MS context releasing process is executed as a process of deleting the connection parameter of the MS 6 that is retained by the BS 4-1 (#1) (step S215). After deleting the connection parameter, the connection with BS 4-1(#1) is not restored even when the MS 6 executes the reconnection procedure. The MS 6 continuously has stored therein the connection parameter. More specifically, the connection parameter is stored and retained in the connection parameter storing unit 116 in the data storing unit 108 of the MS 6.

Even when the time period by the resource retention timer 80 has expired, the communication control unit 66 of the modem unit 60 executes scanning for a neighborhood BS when the disconnection monitoring time period of the upper layer session disconnection monitoring timer 78 has not expired (step S216).

It is assumed that the BS 4-2(#2) can be found in the scanning process (step S216). In this case, the MS 6 executes the initial connection procedure referred to as "Initial Network Entry" between the MS 6 and the BS 4-2(#2) (steps S216 and S217). More specifically, the modem unit 60 transmits an RNG-REQ message and receives an RNG-RSP message from the BS 4-2(#2). The modem unit 60 transmits an SBC-REQ (Subscriber Station Basic Capability Request) message and receives an SBC-RSP (Subscriber Station Basic Capability Response) message from the BS 4-2(#2). The modem unit 60 further transmits a PKM-REQ (Privacy Key Management Request) message and receives a PKM-RSP (Privacy Key Management Response) message from the BS 4-2 (#2), and finally transmits an REG-REQ (Registration Request) message and receives an REG-RSP (Registration Response) message from the BS 4-2(#2). In the initial connection procedure, the above messages are exchanged. The "SBC-REQ" is a request for a terminal function. The "SBC-RSP" is a response to a notification by the terminal function. The "PKM-REQ" is a request for an encryption key management. The "PKM-RSP" is a response to the request therefor. The "REG" is registration and refers to a negotiation process for a system operation mode between the MS and the BS after authentication and key distribution. The "REG-REQ" is a request for the negotiation. The "REG-RSP" is a response to the request therefor.

To restore the connection state of the link layer, the operation is shifted from the initial connection procedure (step S217) to the restoring process. The MS 6 restores the connection created before the disconnection using the connection parameter that the MS 6 has stored therein (step S218). More specifically, the modem unit 60 transmits a DSA-REQ (Dynamic Service Addition-Request) message, receives a DSA-RSP (Dynamic Service Addition-Response) message from the BS 4-2(#2) using the modem unit 60, and creates the connection.

In this case, during the counting by the upper layer session disconnection monitoring timer 78 of the modem unit 60, the communication application unit 64 causes the upper layer retransmission timer 89 to start counting (step S219) and causes the upper layer retransmission timer 89 to execute a plurality of retrials. In this case, the counting by the upper layer retransmission timer 89 is executed from a retrial 1 to a retrial 7 (steps S220 to S226). At this time, the message retransmitting process (steps S227 to S232) is executed. During the time period of the retrial 7, the wireless connection is restored and the counting by the upper layer retransmission timer 89 for the retrial 7 is stopped (step S226).

When the DSA-RSP message arrives at the modem unit 60 (step S233), the communication application unit 64 executes retransmission of the message (step S232) and, thereby, the modem unit 60 notifies the BS 4-2 of the message received. This message is transferred from the BS 4-2 to the server 20. When the server 20 receives the message, the server 20 executes transmission of a response (step S234). A message transmitted as a response is transferred to the BS 4-2, arrives at the modem unit 60 from the BS 4-2, and is transferred to the communication application unit 64 through the application OS unit 62.

In this manner, even after the resource retention time period has elapsed, when the communication state of the link layer can be restored within the upper layer session retention time period, the communication application unit 64 retransmits the message and, thereby, the message transmitted as the response is received from the server 20 and the upper layer session disconnection monitoring timer 78 is stopped (step S211). Therefore, the communication session can continuously be used.

(3) Process Executed for Impossible Restoration

Figure 13:
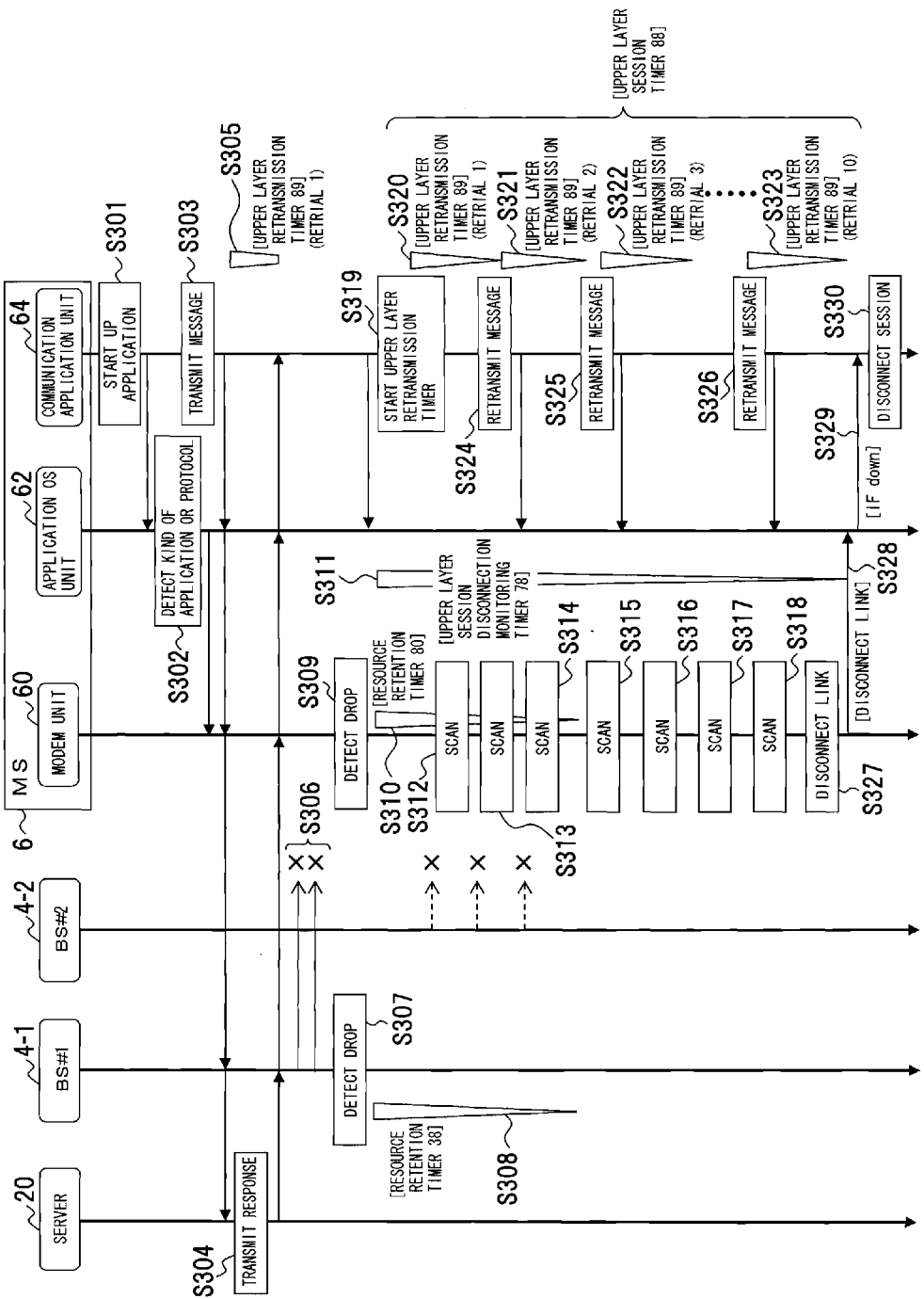
FIG. 13 is a diagram of an operation sequence executed when the recovery is unsuccessfully completed.

The process executed for impossible restoration will be described with reference to FIG. 13. FIG. 13 is a diagram of an operation sequence executed when the connection is not restored.

This process includes the connecting process (steps S301 to S305). The connecting process is same as the above process (steps S101 to S105), that is, the restoration within the connection parameter retention time period and, therefore, will not again be described.

The process executed for the impossible restoration is executed in the case where, though the MS 6 scans for the BS 4 that is connectable within the resource retention time period, the MS 6 does not find such a BS 4 and, therefore, the counting of each of the resource retention timers 38 and 80 expires. This process is also executed in the case where no BS 4 that is connectable can be found within the upper layer session retention time period and the counting by the upper layer session disconnection monitoring timer 78 expires.

In this case, the modem unit 60 notifies the application OS unit 62 of "Down" of the link layer. The application OS unit 62 causes the logical interface (IF) to be in the "Down" state and notifies all the applications that execute socket communication through the logical interface of the disconnection of the session. When the session is disconnected, the communication application unit 64 outputs an error notification that represents the disconnection of the session, to the user.

More specifically, when the BS 4-1(#1) that is connected executes a drop detecting process (steps S306 and S307), the resource retention timer 38 starts counting (step S308). After detecting the drop (step S309), the modem unit 60 causes the resource retention timer 80 to start counting (step S310) and causes the upper layer session disconnection monitoring timer 78 to start counting (step S311). In the disconnection monitoring time period of the upper layer session disconnection monitoring timer 78, the modem unit 60 repeatedly executes consecutively the scanning process (steps S312 to S318). This scanning process is executed for a time period exceeding the resource retention time period and is executed until the counting by the upper layer session disconnection monitoring timer 78 expires.

After the modem unit 60 has detected the drop, the communication application unit 64 causes the upper layer retransmission timer 89 to start (step S319) and repeats a retrial. In this case, the counting process by the upper layer retransmission timer 89 is continuously executed for the retrials 1 to 10 (steps S320 to S323). During this, the communication application unit 64 repeatedly executes retransmission of the message for the application OS unit 62 (steps S324 to S326).

After the scanning process (step S318), when the modem unit 60 detects a disconnection of the link (step S327), the modem unit 60 issues a notification of this disconnection of the link (step S328) and the application OS unit 62 receives the notification of the disconnection of the link. The application OS unit 62 notifies the communication application unit 64 of the disconnection of the link of the modem unit (step S329) and the communication application unit 64 executes a session disconnecting process (step S330).

Figure 14:
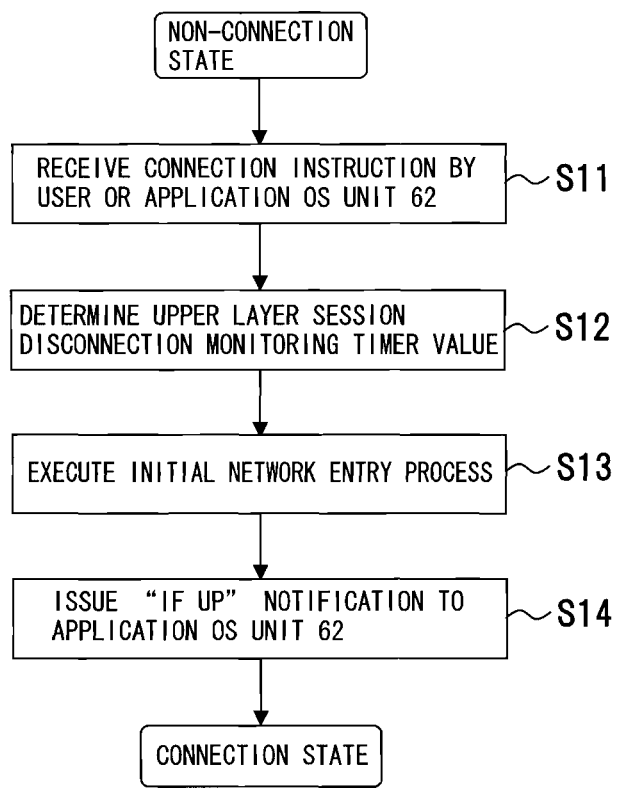
FIG. 14 is a flowchart of a process procedure for transitioning from a non-connection state to a connection state.
Figure 15:
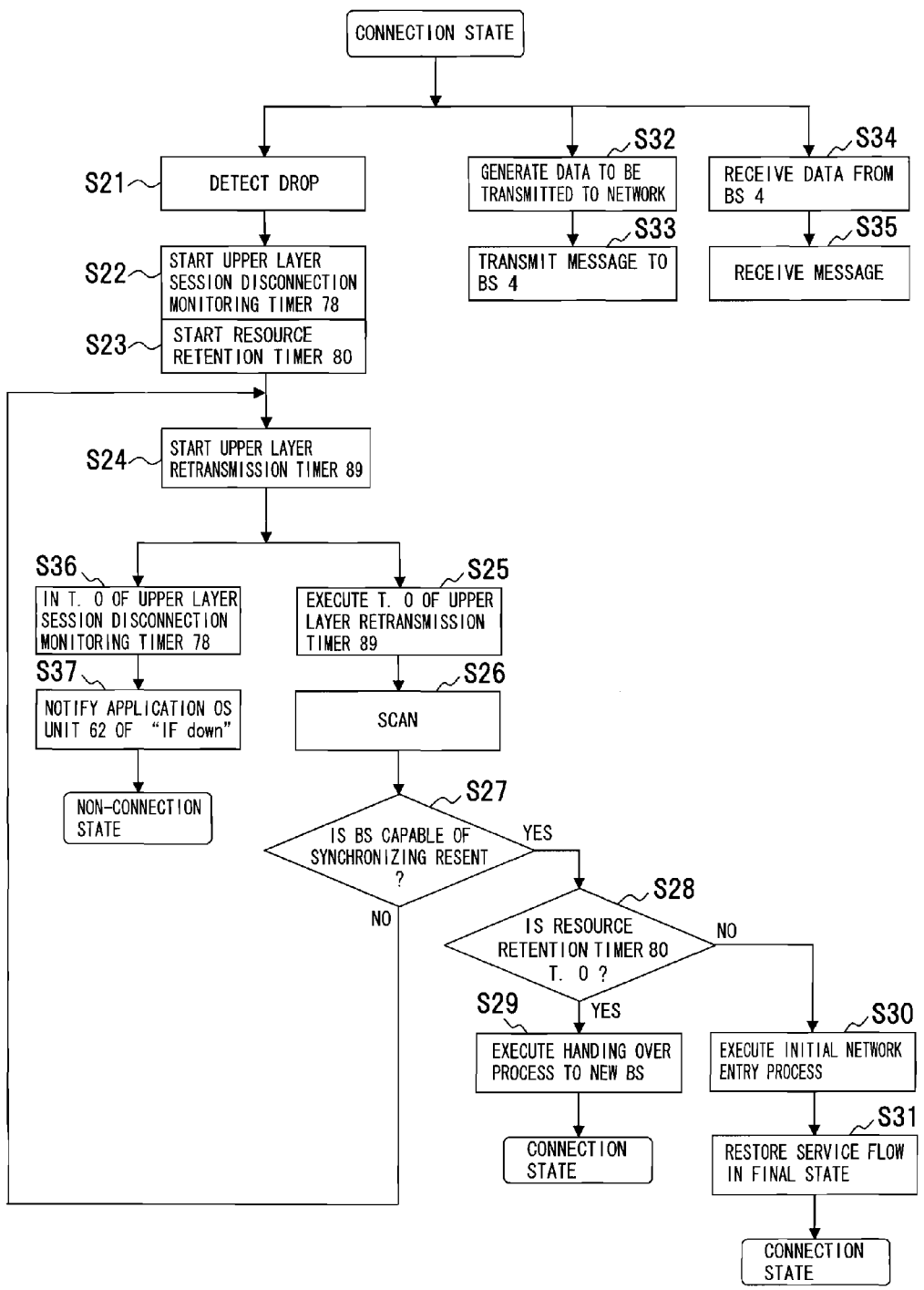
FIG. 15 is a flowchart of a process procedure for an event process executed in the connection state.

The processes executed by the MS will be described with reference to FIGS. 14 and 15. FIG. 14 is a flowchart of a process procedure for transitioning from the non-connection state to the connection state. FIG. 15 is a flowchart of a process procedure for an event process in the connection state.

As depicted in FIG. 14, the state of the MS 6 in the non-connection state transitions from the non-connection state to the connection state. The MS 6 receives a connection instruction for the wireless connection (step S11). The connection instruction is created by the user or the application OS unit 62. Based on the connection instruction, the application OS unit 62 determines an upper layer session disconnection monitoring timer value (step S12). Based on the determination of the upper layer session disconnection monitoring timer value, the MS 6 executes an initial network entry process (step S13) and issues an "Up" notification of the interface to the application OS unit 62 (step S14). Thereby, the state of the MS 6 is shifted to the connection state.

As depicted in FIG. 15, the state of the MS 6 has transitioned to the connection state and the MS 6 executes an event process. Thereby, the connection state of the MS 6 is maintained or is transitioned to the non-connection state. When the MS 6 in its connection state detects the drop (step S21), the MS 6 causes the upper layer session disconnection monitoring timer 78 to start counting (step S22) and simultaneously causes the resource retention timer 80 to start counting (step S23). After the starts of the above countings, the MS 6 causes the upper layer retransmission timer 89 to start counting scanning retrials (step S24), executes the timeout (T. O) process of the upper layer retransmission timer (step S25), and executes a scanning process (step S26).

It is determined as the result of the scanning process whether any BS capable of synchronizing is present (step S27). When it is determined that a BS capable of synchronizing is present (YES of step S27), it is determined whether the resource retention timer 80 has detected a timeout (step S28). When it is determined that the resource retention timer 80 has detected a timeout (YES of step S28), the handing over process to hand over to the new BS is executed (step S29) and a connection state with the new BS is maintained.

When it is determined that the resource retention timer 80 has detected no timeout (NO of step S28), the initial network entry process is executed (step S30) and restoration of the service flow in the final state is executed (step S31). Thereby, the connection state is maintained.

When the MS 6 is in the connection state, the MS 6 executes processes that are generation of data to be transmitted to the network (step S32), transmission of a message to the BS 4 that is connected to the MS 6 (step S33), reception of data from the BS 4 (step S34), and reception of a message (step S35).

When the upper layer session disconnection monitoring timer 78 has the timeout (step S36) after the start of the counting by the upper layer retransmission timer 89 (step S24), the MS 6 notifies the application OS unit 62 of "IF Down" (step S37) and the state of the MS 6 transitions to the non-connection state.

Figure 16:
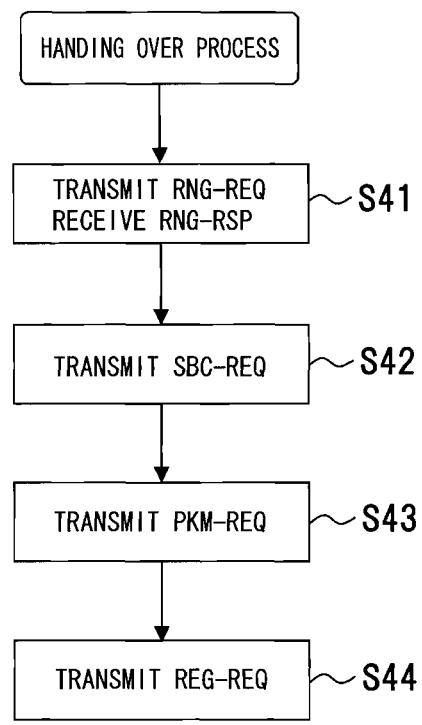
FIG. 16 is a flowchart of a process procedure for a handing over process.
Figure 17:
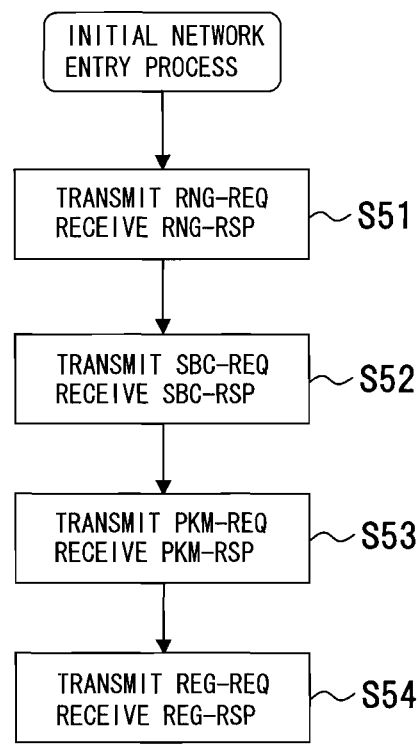
FIG. 17 is a flowchart of a process procedure for an initial network entry process.

The difference between the handing over process and the initial network entry process will be described with reference to FIGS. 16 and 17. FIG. 16 is a flowchart of a process procedure for a handing over process. FIG. 17 is a flowchart of a process procedure for an initial network entry process.

In the handing over (HO) process, as depicted in FIG. 16, the RNG-REQ is transmitted and the RNG-RSP is received (step S41). When handing over is executed, the RNG-REQ message includes an RPI (Ranging Purpose Indication) message and "1" is set in "Bit #0" of this message. Thereby, it is represented that the RNG-REQ is transmitted for the MS 6 to execute the handing over process.

In the handing over process, the SBC-REQ is transmitted (step S42), the PKM-REQ is transmitted (step S43), and the REG-REQ is transmitted (step S44). The messages used at steps S42 to S44 are omitted when the optimization has reached the highest level.

On the other hand, in the initial network entry process, as depicted in FIG. 17, the RNG-REQ is transmitted and the RNG-RSP is received (step S51). Different from the handing over process, the RPI message is not included in the RNG-REQ message in the initial network entry process.

The SBC-REQ is transmitted and the SBC-RSP is received (step S52). The PKM-REQ is transmitted and the PKM-RSP is received (step S53). The REG-REQ is transmitted and the REG-RSP is received (step S54).

Figure 18:
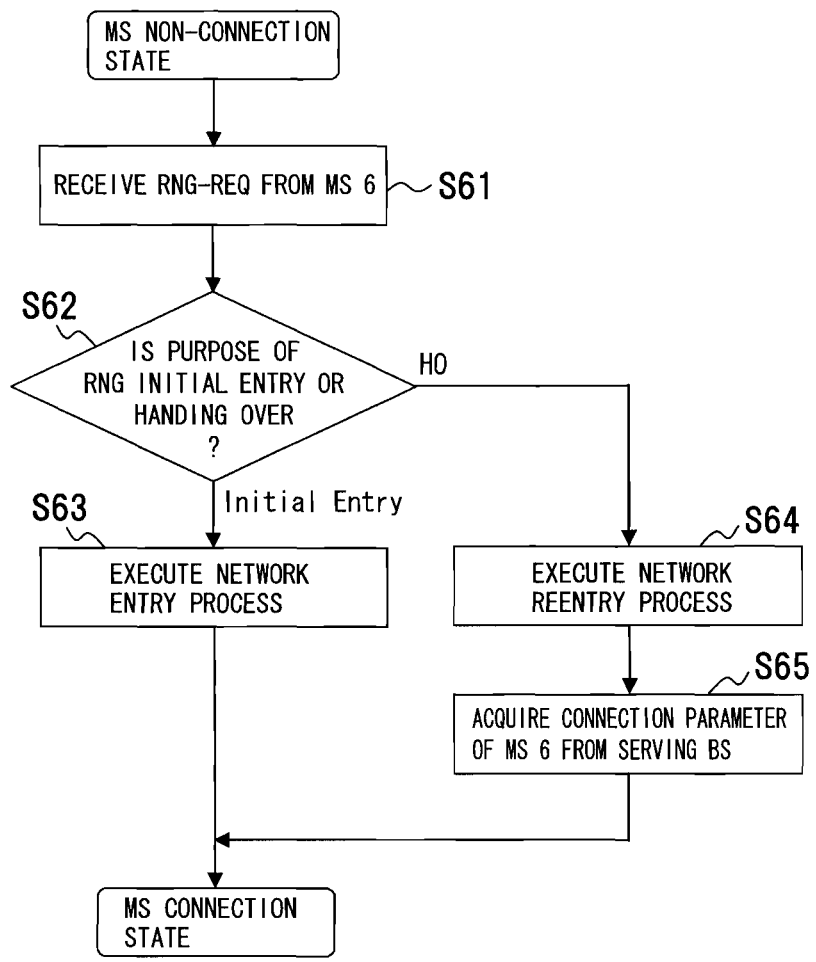
FIG. 18 is a flowchart of a process procedure for transitioning from an MS non-connection state to an MS connection state.
Figure 19:
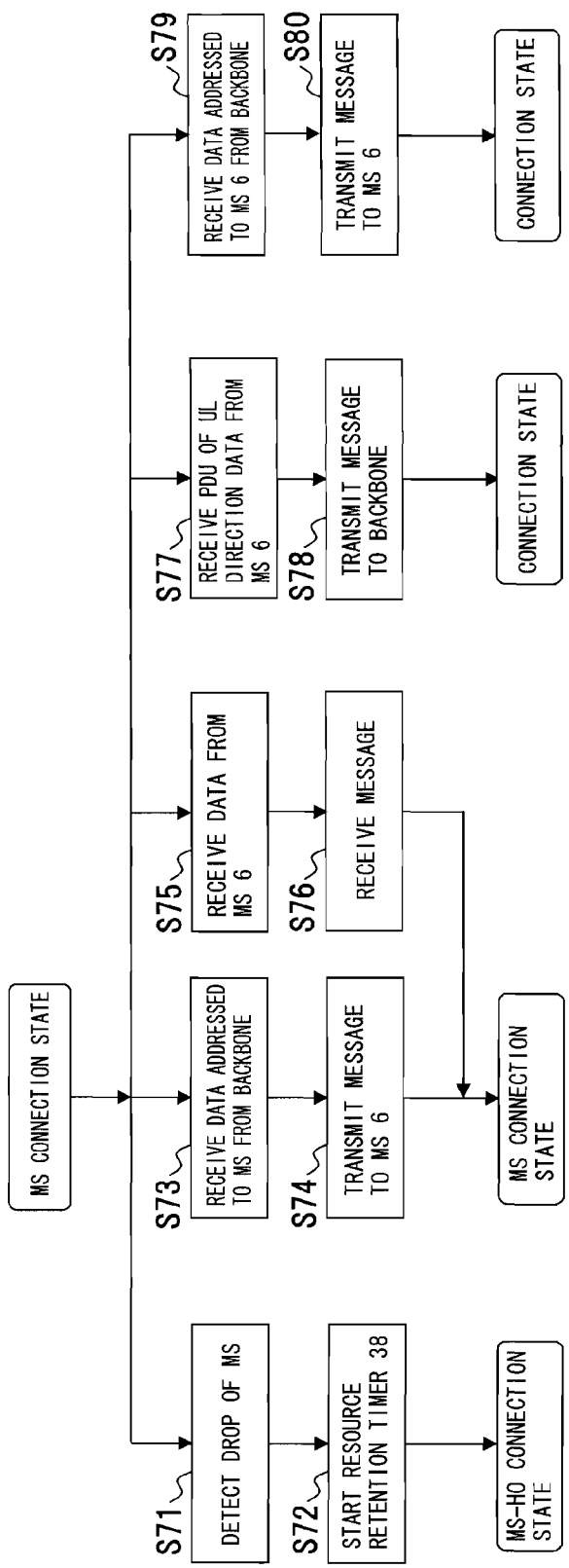
FIG. 19 is a flowchart of a process procedure for an event process executed in the MS connection state.
Figure 20:
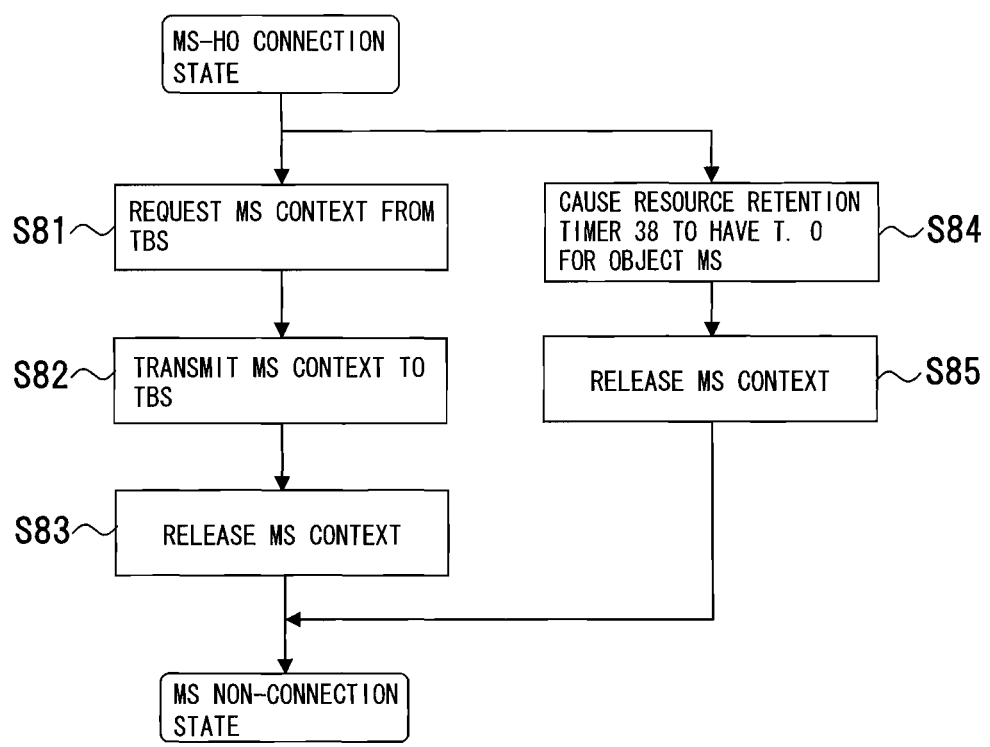
FIG. 20 is a flowchart of a process procedure for an event process executed in an MS handing over state.

Processes executed by the BS will be described with reference to FIGS. 18 to 20. FIG. 18 is a flowchart of a process procedure for transitioning from the non-connection state to the connection state of the MS. FIG. 19 is a flowchart of a process procedure for an event process in the connection state of the MS. FIG. 20 is a flowchart of a process procedure for an event process in the handing over state of the MS.

As depicted in FIG. 18, the BS that is not connected to the MS 6 receives the RNG-REQ transmitted from the MS 6 (step S61). It is determined whether the purpose of the RNG-REQ received is an initial entry or handing over (step S62). The purpose may be determined based on whether the RPI message is included in the RNG-REQ.

When it is determined that the purpose is the initial entry, the network entry process is executed (step S63) and the state of the BS transitions to an MS connection state.

When it is determined that the purpose is not the initial entry, that is, the RNG-REQ is to hand over, the network reentry process is executed (step S64) and the connection parameter (context) of the MS 6 is received from the serving BS (step S65). The state of the BS is transitioned to the MS connection state. The "serving BS" is the BS that has been connected to the MS 6 before the handing over.

As depicted in FIG. 19, the BS 4 in the MS connection state executes the event process and the state of the BS transitions to a handing over connection state, the MS connection state, or another connection state. The BS 4 detects the drop of the MS 6 that is connected to the BS 4 (step S71). Based on this detection of the drop, the counting of the resource retention timer 38 is started (step S72) and the state of the BS 4 transitions to the MS handing over state.

When the state of the BS 4 is the MS connection state: the BS 4 receives data addressed to the MS 6 that is connected to the BS 4, from the backbone (step S73); transmits a message to the MS 6 that is connected to the BS 4 (step S74); and maintains the MS connection state. The BS 4: receives data from the MS 6 (step S75); receives a message (step S76); and maintains the MS connection state.

The BS 4: receives a PDU (Protocol Data Unit) of a UL (Up Link) direction data from the MS 6 (step S77); transmits a message to the backbone (step S78); and maintains the connection state. The BS 4: receives data addressed to the MS from the backbone (step S79); transmits a message to the MS 6 (step S80); and maintains the connection state.

In the handing over state, as depicted in FIG. 20, the BS 4 receives a request for the connection parameter as an MS context request from a TBS (Target BS) (step S81). Based on this request, the BS 4 transmits the connection parameter as transmission of the MS context to the TBS (step S82). After this transmission of the context, the BS 4 releases the MS context (step S83). The state of the BS 4 transitions to the MS non-connection state. In the handing over state, the BS 4: causes the resource retention timer 38 to have a timeout for the object MS (step S84); releases the MS context (step S85); and causes the state of the BS 4 to transition to the MS non-connection state.

Features, advantages, and modifications of the second embodiment will be listed below.

(1) The wireless link layer of the MS acquires the communication session retention time period of the upper layer on the MS. When the wireless connection is disconnected, the connection of the wireless link layer is restored based on the reconnection procedure that is defined in the link layer within the connection parameter retention time period for the BS (the time period during which the BS can retain the connection parameter and restore the wireless link layer). In this case, even after the connection parameter retention time period has elapsed for the BS, the MS retains the connection parameter retained when the connection is disconnected until the time period expires during which the communication session of the application can be maintained. Therefore, the MS keeps notifying the upper layer of its state of being connected to the link, and executes the initial connection procedure for the BS. Thereafter, the MS restores the connection of the wireless link layer using the connection parameter acquired when the connection is disconnected.

(2) The MS may be adapted to, in the case where the MS executes the initial connection procedure, when the MS receives a connection parameter of an adjacent BS from the BS that the MS has communicated before the disconnection, omit reception of the connection parameter from the new BS and start the initial connection process.

(3) The MS may dynamically determine the upper layer session retention time period (=communication session retention time period) of the MS by judging the kind of communication application from the port number that is used by the application operating on the MS.

(4) The MS may dynamically determine the upper layer session retention time period of the MS from the port number that is included in a packet.

(5) As to the wireless connecting method, the MS acquires the time period during which the wireless link layer of the MS can maintain the communication session in the upper layer on the MS. When the MS disconnects the connection, the connection of the wireless link layer is restored based on the reconnection procedure within the connection parameter retention time period for the BS. Even when the connection parameter retention time period has elapsed for the BS, the MS retains the connection parameter acquired when the connection is disconnected, until the communication session retention time period of the application expires. The MS keeps notifying the upper layer of its state of being connected to the link, executes the initial connection procedure for the BS, and restores the connection of the wireless link layer using the connection parameter acquired when the connection is disconnected.

(6) Being configured to include the MS, the wireless connection system can realize the above restoration of the connection when the connection is disconnected.

(7) The BS may be adapted to delay the release of the IP address corresponding to the port number included in a packet in the communication session after the BS has deleted the connection parameter of the MS.

(8) Even the connection parameter retention time period of the BS has elapsed, the MS can resume the communication without causing the user to be aware of the procedure of resuming the communication session until the communication session retention time period of the application elapses. Therefore, the connectability to the network is improved. Therefore, the connecting function is improved and is enhanced.

(9) In the embodiment, the BS can reduce the memory to retain the connection parameter of the MS and can reduce the load of retaining the connection parameter.

[c] Third Embodiment

A third embodiment is adapted to identify a communication application that opens a communication session, correlate a communication session retention time period (session timer value) to each application, and, thereby, restores the connection.

Figure 21:
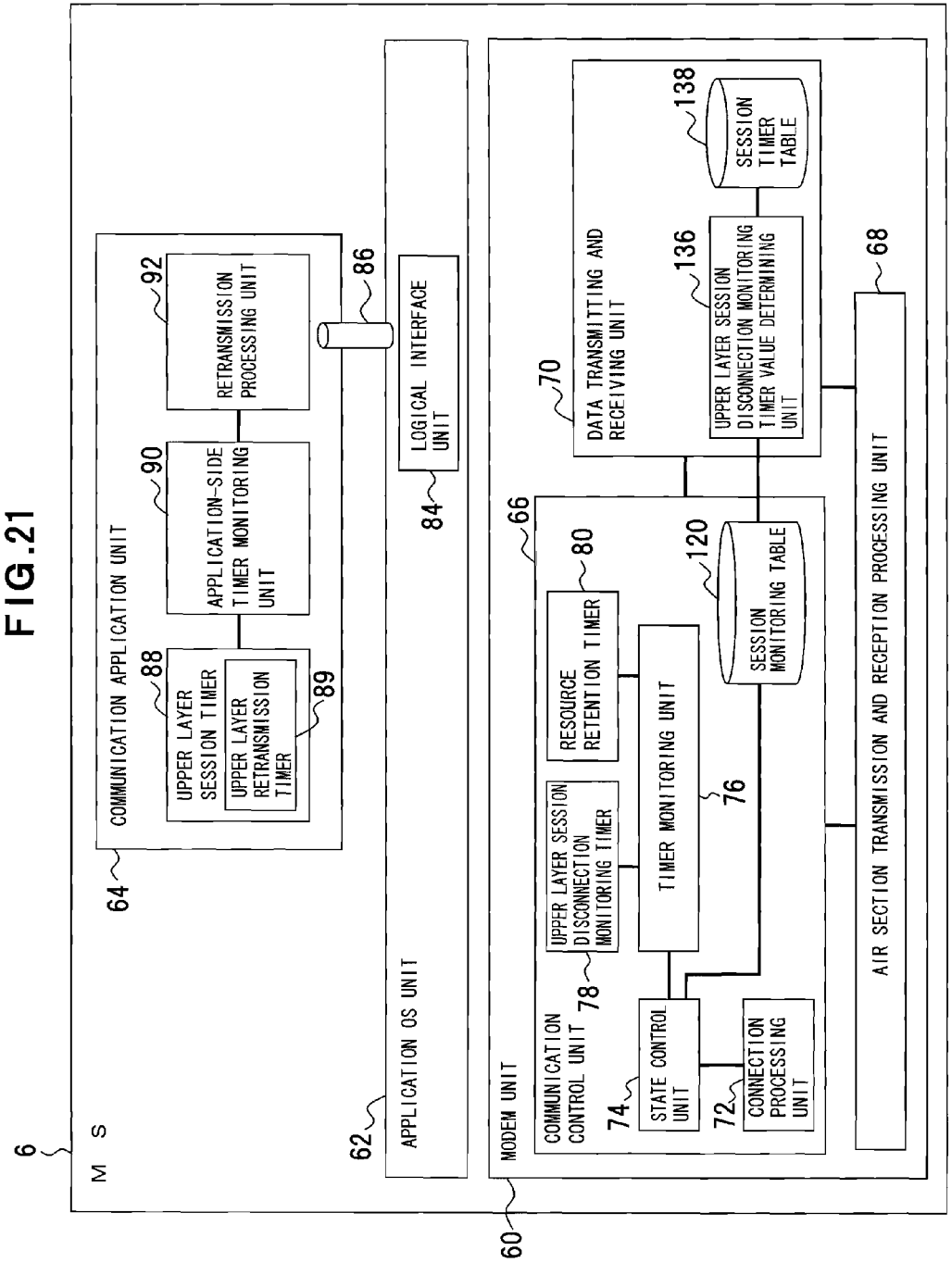
FIG. 21 is a diagram of an exemplary configuration of functional units of a communication terminal device according to a third embodiment.
Figure 22:
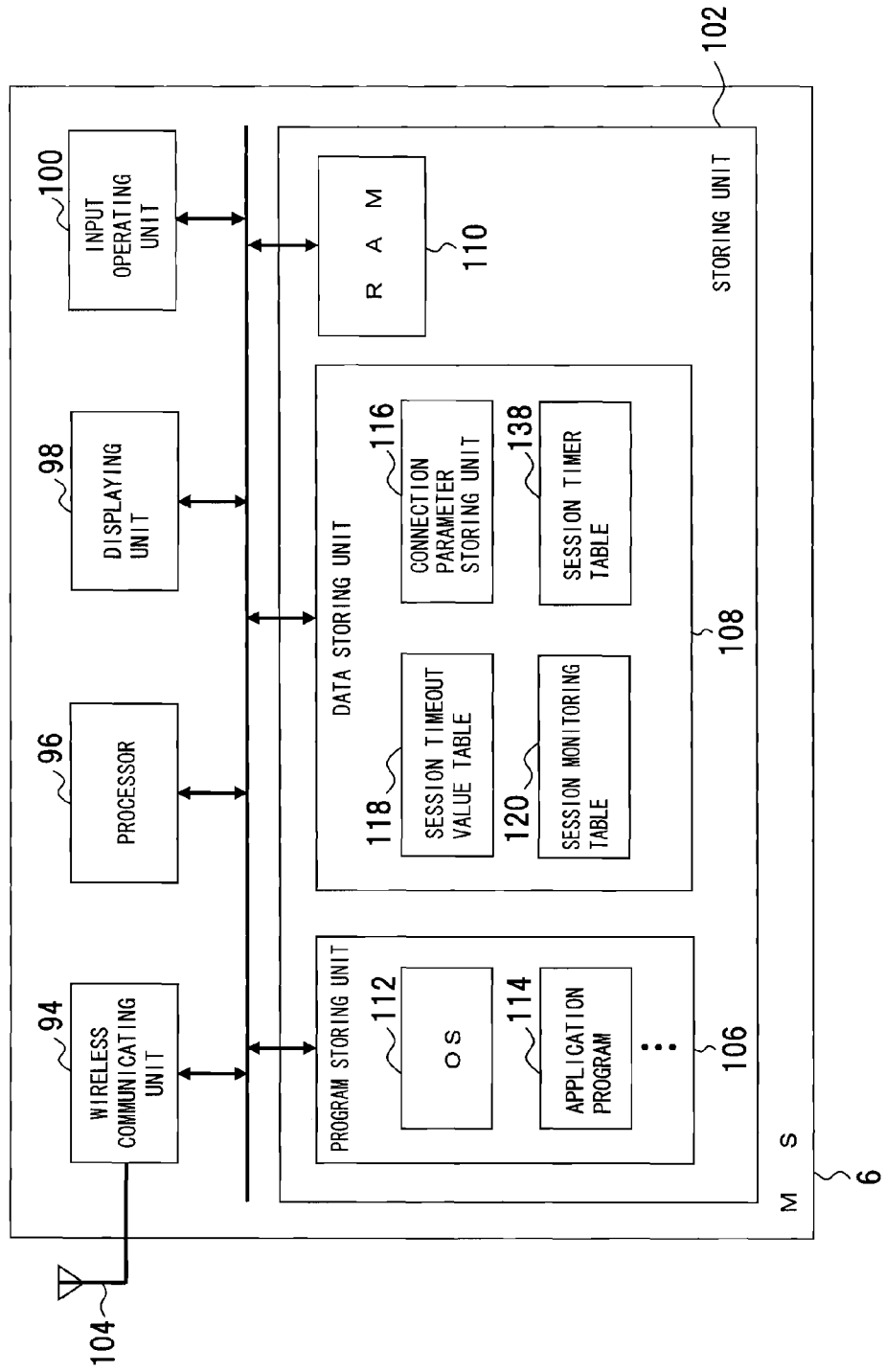
FIG. 22 is a diagram of an exemplary configuration of hardware of the communication terminal device.

The third embodiment will be described with reference to FIGS. 21 and 22. FIG. 21 is a diagram of an exemplary configuration of functional units of a communication terminal device according to the third embodiment. FIG. 22 is a diagram of an exemplary configuration of hardware of the communication terminal device. In FIGS. 21 and 22, the same components as those in FIGS. 6 and 7 are given the same reference numerals.

Figure 28:
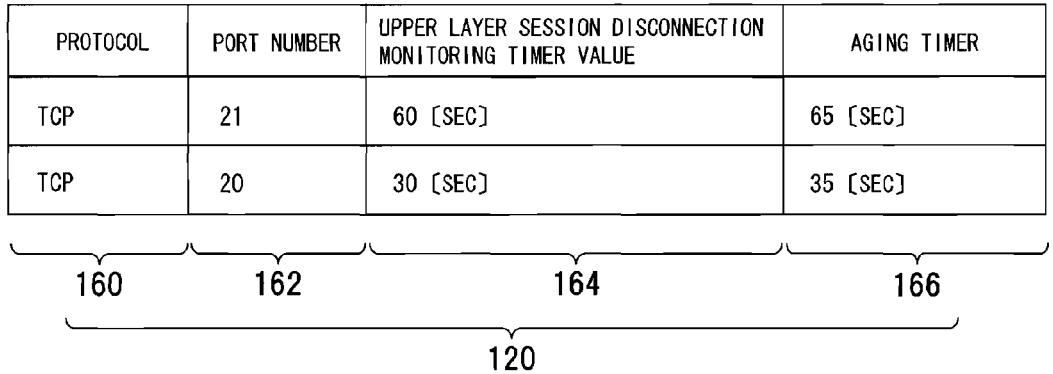
FIG. 28 is a diagram of an example of a session monitor table.

The MS 6 of the embodiment has set in the modem unit 60 the session monitoring table 120 (FIG. 28). As above, the session monitoring table 120 is a means of storing the session monitoring data and used to create timer event in case of disconnection of the wireless connection.

Corresponding to the session monitoring table 120, the data transmitting and receiving unit 70 includes an upper layer session disconnection monitoring timer value determining unit 136 and a session timer table 138. As above, the upper layer session disconnection monitoring timer value determining unit 136 is a functional unit that monitors the abortion of the communication of the communication session, detects the time period from the abortion of the communication to the abandonment of the session, and notifies of the time period.

The session timer table 138 has stored therein the session timer value.

In the embodiment, the upper layer session disconnection monitoring timer value determining unit 82 (FIG. 6) is omitted from the application OS unit 62.

As to the MS 6, the above described and just above functions are realized by the hardware depicted in FIG. 22 and the session monitoring table 120 and the session timer table 138 are set in the data storing unit 108.

The configuration of the BS 4 is same as that of the second embodiment and, therefore, will not again be described.

In the embodiment, when the communication is executed using a protocol of identifying a communication application that opens a session from a port number of TCP/UDP (User Datagram Protocol), etc., the modem unit 60 refers to a port number included in a message. Thereby, judgment is enabled of the communication application operating in the upper layer.

More specifically, a TCP/UDP header includes a port number of an application on an apparatus in the server 20 and a port number of an application on an apparatus in a client in the communication between a server and a client. A port number of the application of the server 20 is designated as a so-called "Well-Known" port for a famous application. For a message from the MS 6 (client) to the server 20, the addressed port number in the TCP/UDP header can be identified. For a message from the server 20 to the client, the transmission origin port number is referred to, is compared with Well-Known ports, and, thereby, the application that uses the session can be identified. By correlating the timeout value of a session with each application, the application can be identified and the session timer value of the application can be determined.

The data transmitting and receiving unit 70 of the modem unit 60 includes the upper layer session disconnection monitoring timer value determining unit 136. The upper layer session disconnection monitoring timer value determining unit 136 transmits to the BS 4 a packet that is received by the data transmitting and receiving unit 70 from the application OS unit 62. When this transmission is executed or when the message addressed to the MS 6 is received from the BS 4, the upper layer session disconnection monitoring timer value determining unit 136 refers to the TCP/UDP header of a packet included in the message, identifies the port number, and refers to the session timer table 138 (FIG. 23) using the port number. Based on the session timer table 138, the upper layer session disconnection monitoring timer value is identified for the session created by the application.

Figure 23:
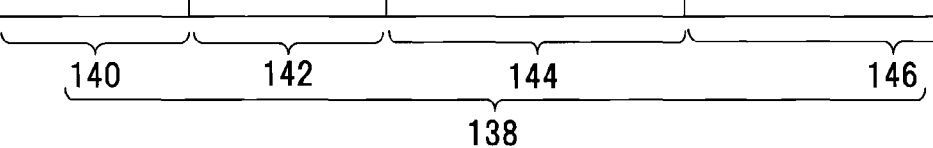
FIG. 23 is a diagram of an example of a session timer table.

The session timer table 138 will be described with reference to FIG. 23. FIG. 23 is a diagram of an example of the session timer table.

The session timer table 138 is an example of a table that has recorded therein a session disconnection monitoring timer value as the timeout value of a session that is correlated with each application operating in the upper layer.

As depicted in FIG. 23, the session timer table 138 has set therein a protocol storing unit 140, a port number storing unit 142, an application name storing unit 144, and an upper layer session disconnection monitoring timer value storing unit 146. The protocol storing unit 140 has stored therein information that indicates a protocol such as TCP. The port number storing unit 142 has stored therein a numerical value that represents a port number. The application name storing unit 144 has stored therein information that indicates an application name such as FTP. The upper layer session disconnection monitoring timer value storing unit 146 has stored therein numerical value data that represents an upper layer session disconnection monitoring timer value such as "30" [sec] for, for example, TCP of number 20, and is adapted for the upper layer session disconnection monitoring timer value to be identified based on a port number and an application name.

The upper layer session disconnection monitoring timer value determining unit 136 searches the session timer table 138 using, for example, the kind of protocol (TCP/UDP) from the header of the packet included in the PDU in the WiMAX layer as a key and the Well-Known port number acquired from the header of TCP or UDP as another key, that is, based on the kind of protocol and the Well-Known port number and, thereby, can determine the upper layer session disconnection monitoring timer value. When the MS 6 has a plurality of sessions and the upper layer session disconnection monitoring timer value determining unit 136 acquires a different upper layer session disconnection monitoring timer value, the shortest value may be employed.

Figure 24:
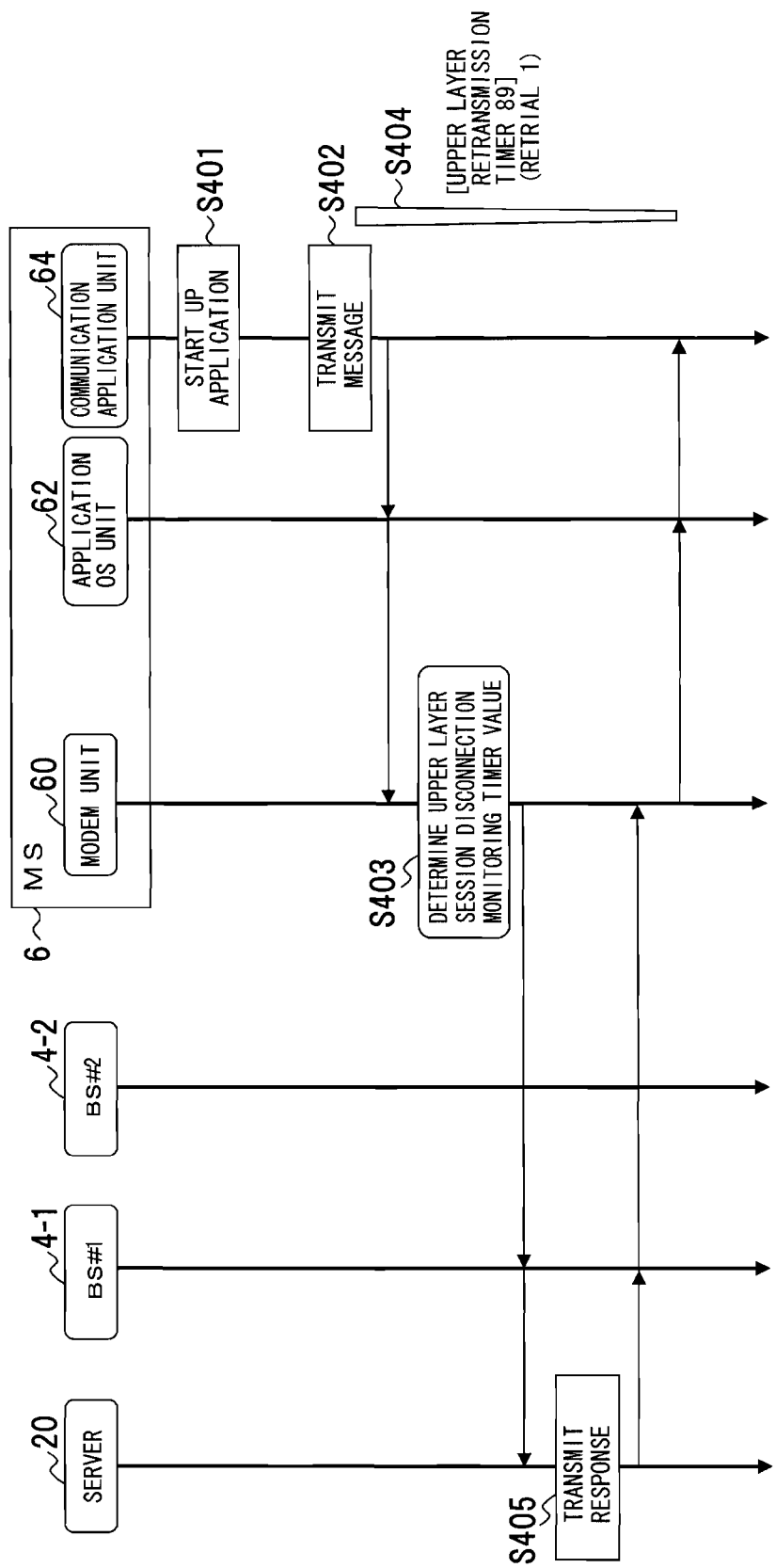
FIG. 24 is a flowchart of a process procedure for the wireless connection.

A connection process that includes a process of determining the upper layer session disconnection monitoring timer value will be described with reference to FIG. 24. FIG. 24 is a flowchart of a process procedure of the wireless connection.

As depicted in FIG. 24, according to the process procedure, the communication application unit 64 is started up (step S401) and a message is transmitted (step S402). This message is configured by the application OS unit 62 as a packet of TCP/IP or UDP/IP and is delivered to the modem unit 60. The modem unit 60 configures this packet as, for example, PDU of a WiMAX access link. At this time, the upper layer session disconnection monitoring timer value determining unit 136 refers to TCP/IP included in PDU, TCP of UDP/IP, or a UDP header and determines the upper layer session disconnection monitoring timer value (step S403). When a so-called Well-Known port is included in either of the transmission origin port and the addressed port, the session timer table 138 is referred to. The Well-Known ports refer to, for example, the ports within a range of numbers from number zero to number 1023 and are defined by Internet Assigned Numbers Authority (IANA). The upper layer retransmission timer 89 starts counting (step S404).

In this case, in a communication session to transmit a message for the first time from the network to the MS 6, the modem unit 60 may also refer to the port number of the packet included in the message received, for the session.

For a TCP socket, the communication application unit 64 starts up and creates a socket and, when the communication application unit 64 creates a connection with the addressee, an SYN packet and an SYN/ACK packet for TCP flow. This is a process that is executed prior to the transmission of the massage by the communication application unit 64. For TCP, the upper layer session disconnection monitoring timer value determining unit 136 of the modem unit 60 may check the SYN packet. The upper layer session monitoring timer value may be determined in this manner.

After the determination of the upper layer session disconnection monitoring timer value, the message is transmitted from the modem unit 60 to the BS 4-1(#1) and is notified of from the BS 4-1(#1) to the server 20. The server 20 executes transmission of a response (step S405) and notifies the BS 4-1(#1) of the message. The message is transferred from the BS 4-1(#1) to the modem unit 60 and arrives from the modem unit 60 at the communication application unit 64 through the application OS unit 62.

Figure 25:
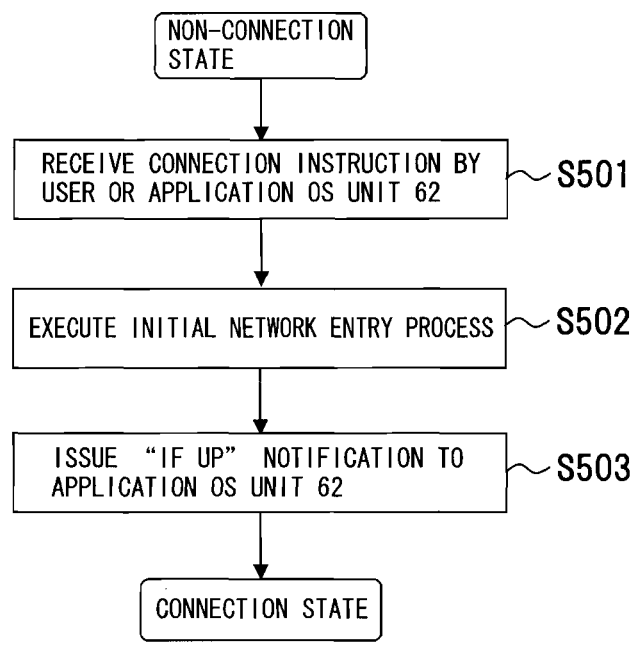
FIG. 25 is a flowchart of a process procedure for transitioning from a non-connection state to a connection state of the MS.
Figure 26:
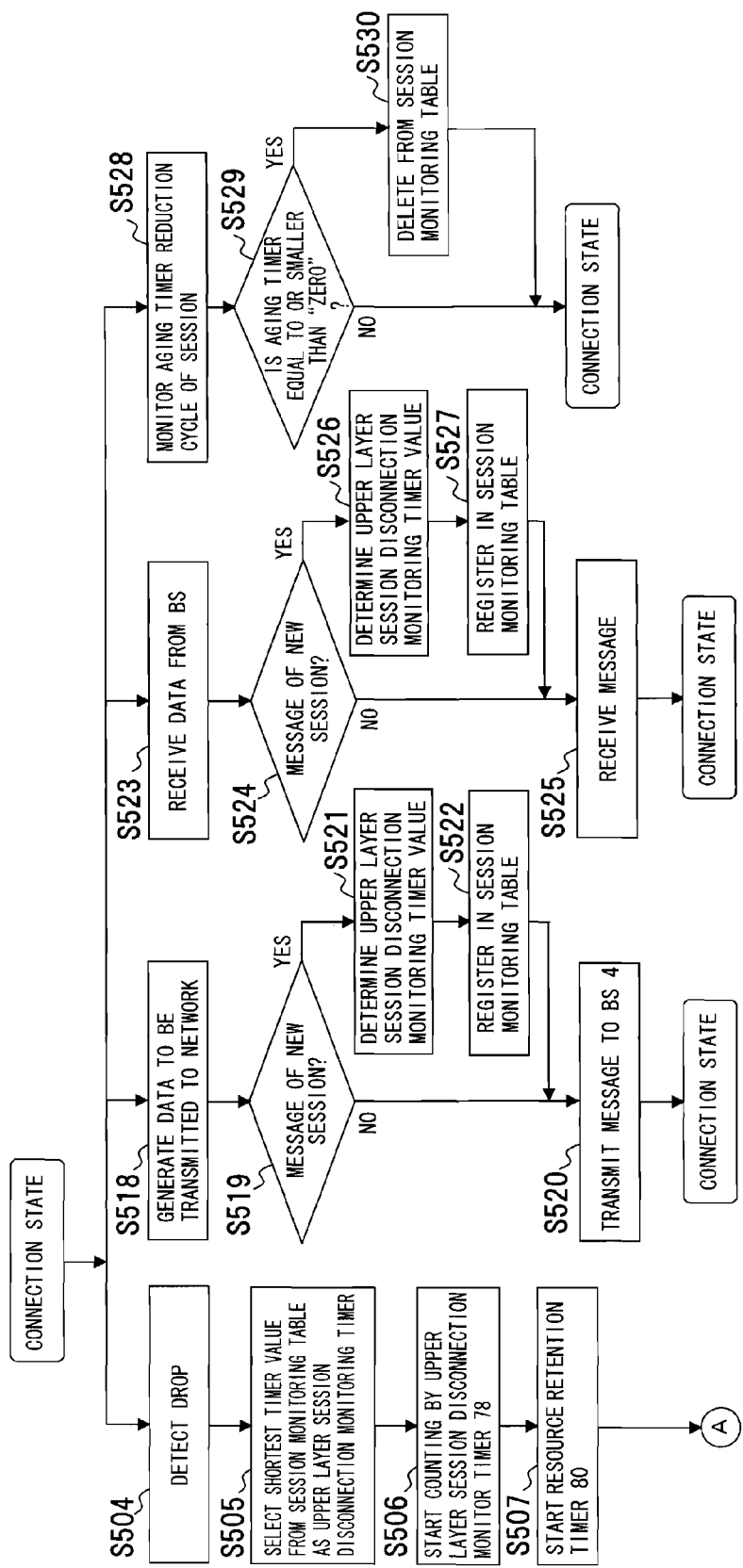
FIG. 26 is a flowchart of a process procedure for an event process executed in the connection state.
Figure 27:
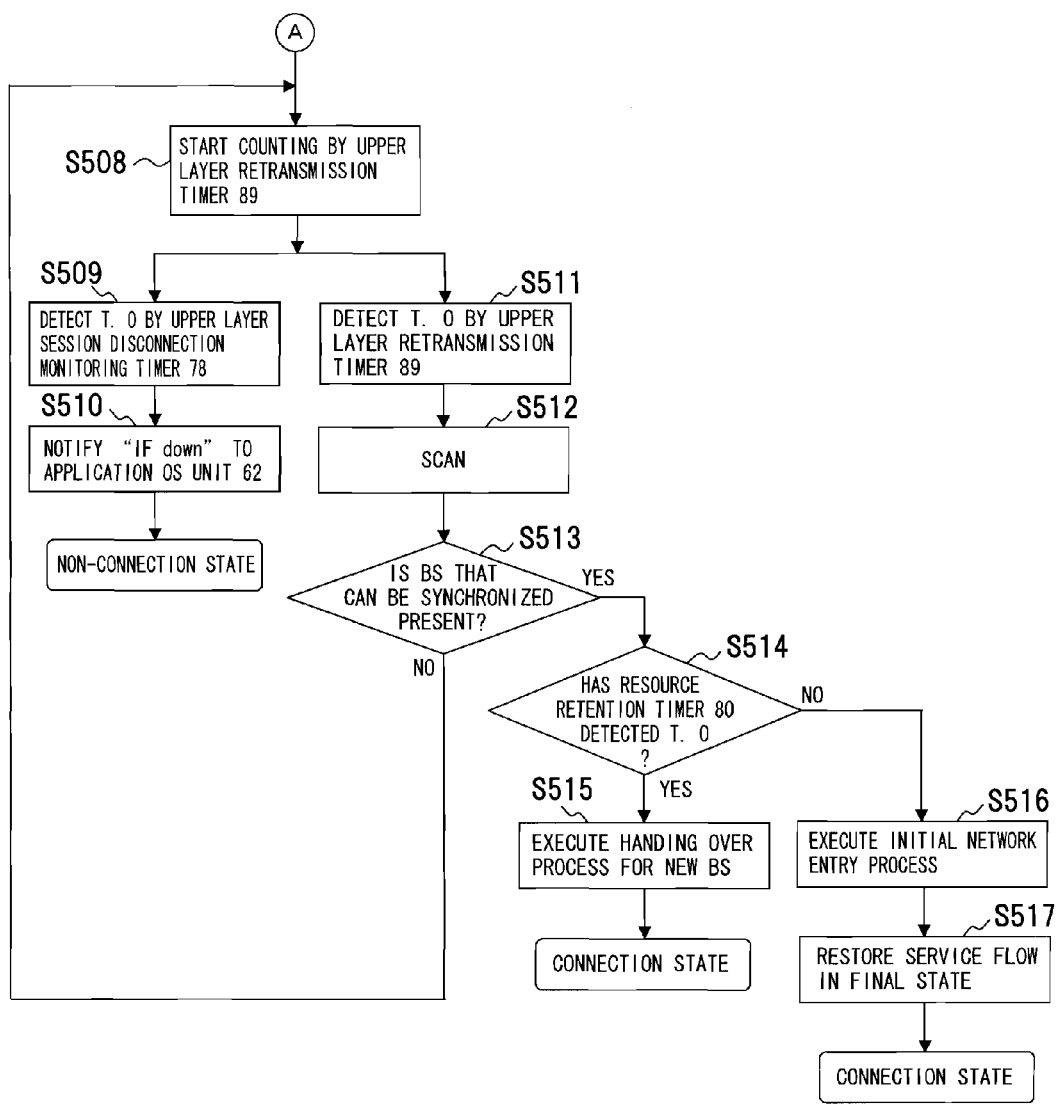
FIG. 27 is a flowchart of a process procedure for an event process executed in the connection state.

Processes of the MS will be described with reference to FIGS. 25 to 27. FIG. 25 is a flowchart of the process procedure for transition of the state of the MS from the non-connection state to the connection state. FIGS. 26 and 27 are flowcharts of a process procedure of an event process in the connection state of the MS. In FIGS. 26 and 27, a symbol "A" denotes a connecting portion between the flowcharts.

As depicted in FIG. 25, when the MS 6 is in the non-connection state, the MS 6 receives a connection instruction from the user or the application OS unit 62 (step S501), executes the initial network entry process (step S502), and executes an "Up" notification of the interface (IF) for the application OS unit 62 (step S503), and the state of the MS 6 transitions to the connection state.

As depicted in FIG. 26, the MS 6 in the connection state selects the shortest timer value from the session monitoring table 120 as the upper layer session disconnection monitoring timer based on the detection of the drop (step S504) (step S505). The counting by the upper layer session disconnection monitor timer 78 is started (step S506) and the counting by the resource retention timer 80 is started (step S507). As depicted in FIG. 27, the counting by the upper layer retransmission timer 89 is started as the scanning retrial timer (step S508). When the upper layer session disconnection monitoring timer 78 detects a timeout (step S509), "Down" of the interface (IF) is notified of to the application OS unit 62 (step S510) and the state transitions to the non-connection state.

When the upper layer retransmission timer 89 detects a timeout (step S511), the scanning process is executed (step S512) and, thereby, it is determined whether any BS that can be synchronized is present (step S513). When it is determined that no BS is present that can be synchronized (NO of step S513), the procedure returns to step S508. When it is determined that a BS is present that can be synchronized (YES of step S513), it is determined whether the resource retention timer 80 has detected a timeout (step S514). When it is determined that the resource retention timer 80 has detected a timeout (YES of step S514), the handing over process is executed for the new BS (step S515) and the state of the MS 6 transitions to the connection state.

When it is determined that the resource retention timer 80 has detected no timeout (NO of step S514), the initial network entry process is executed (step S516) and restoration of the service flow in the final state is executed (step S517). The state of the MS 6 transitions to the connection state.

As depicted in FIG. 26, the MS 6 in the connection state generates data to be transmitted to the network (step S518) and it is determined whether any message of a new session is present (step S519). When it is determined that no message of the new session is present (NO of step S519), a message is transmitted to the BS 4 that is connected to the MS 6 (step S520) and, thereby, the connection state is maintained.

When it is determined that a message of the new session is present (YES of step S519), the upper layer session disconnection monitoring timer value is determined (step S521). This upper layer session disconnection monitoring timer value is registered in the session monitoring table 120 (step S522) and a message is transmitted to the BS 4 (step S520).

The MS 6 in the connection state receives data from the BS 4 (step S523) and it is determined whether the message is that of the new session (step S524). When it is determined that the message is not that of the new session (NO of step S524), the MS 6 receives a message (step S525) and the connection state is maintained.

When it is determined that the message is that of the new session (YES of step S524), the upper layer session disconnection monitoring timer value is determined (step S526). The upper layer session disconnection monitoring timer value is registered in the session monitoring table 120 (step S527) and the message is received (step S525).

An aging timer reduction cycle of the session is monitored (step S528) and it is determined whether the counted value of the aging timer is equal to or smaller than "zero" (step S529). When it is determined that the counted value is not equal to or smaller than "zero" (NO of step S529), the state is connection state. When it is determined that the counted value is equal to or smaller than "zero" (YES of step S529), this value is deleted from the session monitoring table 120 (step S530) and the state is the connection state.

In this process procedure (FIGS. 25 to 27), the MS 6 checks the header of a packet included in PDU in the UL direction or the header of a packet included in PDF received in the DL direction. When the port number of the session is detected that is not registered in the session monitoring table 120, the session timer table 138 is searched and an upper layer session disconnection monitoring timer value corresponding to the session is registered in the session monitoring table 120. For example, when the upper layer session disconnection monitoring timer value determining unit 136 detects a packet (TCP number 21) of the FTP control session, such items are registered in the session monitoring table as the kind of protocol=TCP, the port number=21, and the timeout value (upper layer session disconnection monitoring timer value)= 60 [sec] acquired from the session timer table 138. When the packet (TCP number 20) of the FTP data session is detected, such items are registered in the session monitoring table 120 as the kind of protocol=TCP, the port number=20, and the timeout value=30 [sec] acquired from the session timer table 138.

An aging timer value is set in each entry. This is a timer to delete the session from the session monitoring table 120 after the aging timer time period has elapsed when the use of the session comes to an end. The value of the aging timer may be, for example, the upper layer session disconnection monitoring timer value+five [sec]. The value of the aging timer is reduced at constant cycles, and the entry is deleted when the counted value becomes "zero". The aging timer may be updated with the maximal value that is set every time a packet flows that has the port number registered in the entry.

When the state control unit 74 detects a disconnection, the state control unit 74 checks the session monitoring table 120 (FIG. 28), selects the shortest upper layer session disconnection monitoring timer value, and sets the selected value in the upper layer session disconnection monitoring timer 78.

The session monitoring table will be described with reference to FIG. 28. FIG. 28 is a diagram of an example of the session monitoring table.

As depicted in FIG. 28, the session monitoring table 120 includes a protocol storing unit 160, a port number storing unit 162, an upper layer session disconnection monitoring timer value storing unit 164, and an aging timer value storing unit 166. The protocol storing unit 160 has stored therein protocol information such as TCP used in a communication session. The port number storing unit 162 has stored therein a port number used in a communication session. The upper layer session disconnection monitoring timer value storing unit 164 has stored therein an upper layer session disconnection monitoring timer value. The aging timer value storing unit 166 has stored therein an aging timer value. When the protocol and the port number are determined, the upper layer session disconnection monitoring timer value and the aging timer value that are for the communication session are determined by referring to the session monitoring table 120.

[d] Fourth Embodiment

According to a fourth embodiment, the BS has set therein a configuration to acquire an upper layer application and its upper layer session disconnection monitoring timer value from the header of a packet that passes therethrough. Thereby, the timing is dynamically changed to issue an IP address release instruction from the server to the MS. The BS issues no IP address release instruction from the DHCP server to the MS until the upper layer session disconnection monitoring timer detects a timeout. In the fourth embodiment, the functions added to the modem unit of the third embodiment are realized in the BS.

Figure 29:
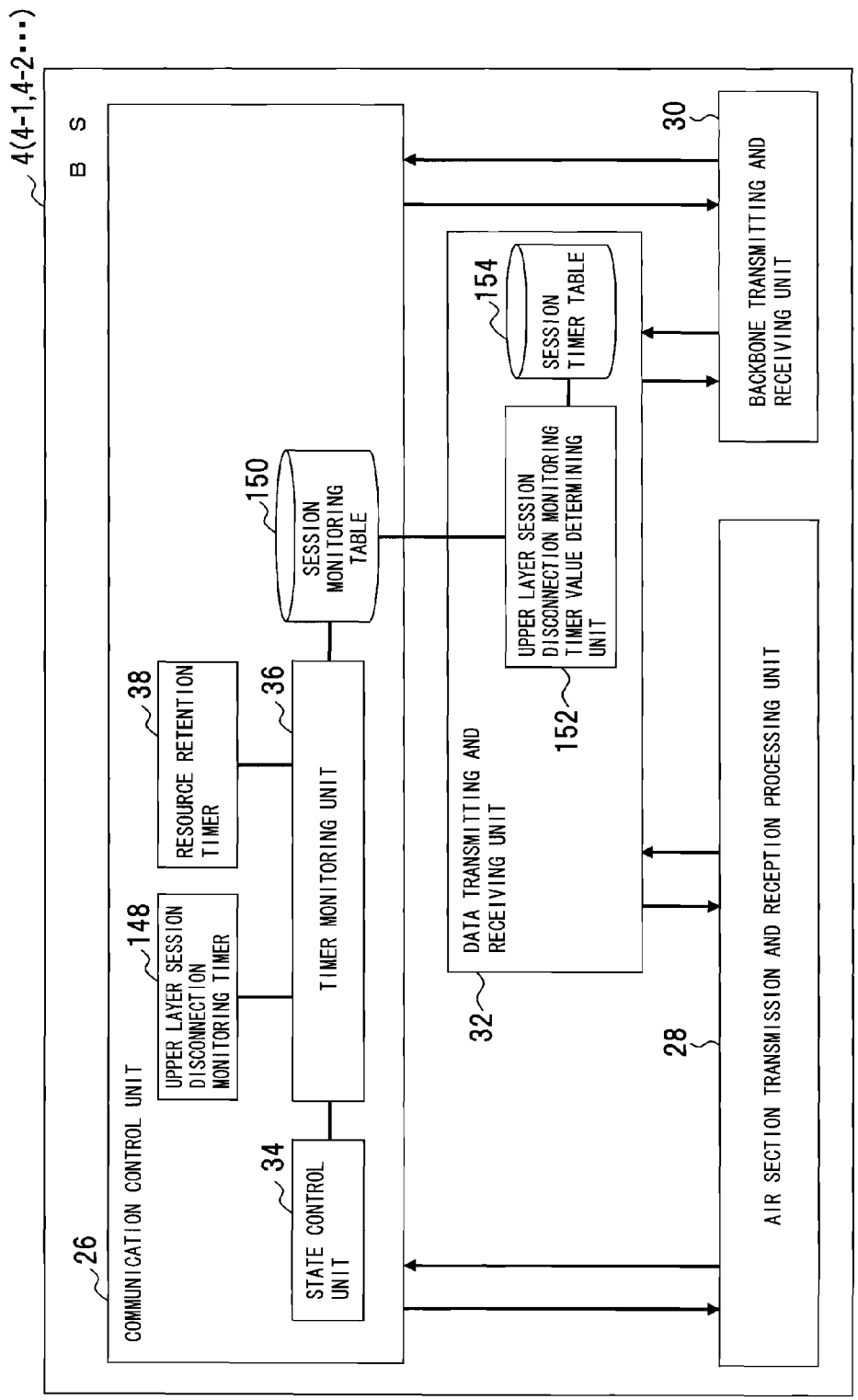
FIG. 29 is a diagram of an exemplary configuration of functional units of a base station according to a fourth embodiment.

The fourth embodiment will be described with reference to FIG. 29. FIG. 29 is a diagram of an exemplary configuration of functional units of a base station according to the fourth embodiment. In FIG. 29, the same components as those in FIG. 4 are given the same reference numerals.

The BS 4 acquires an upper layer application and its upper layer session disconnection monitoring timer value from the header of a packet that passes therethrough. The issuance of the IP address release instruction of the DHCP server to the MS 6 is dynamically changed based on the acquisition of the upper layer session disconnection monitoring timer value.

The IP address release instruction is delayed until the upper layer session disconnection monitoring timer 148 detects a timeout.

In the BS 4, the communication control unit 26 includes an upper layer session disconnection monitoring timer 148 and a session monitoring table 150 in addition to the configuration of the second embodiment.

In the BS 4, the upper layer session disconnection monitoring timer 148 is a timer that monitors the upper layer session retention time period and is a timer that also monitors the maintenance time period during which no-communication state of the communication session is maintained.

The session monitoring table 150 has stored therein session monitoring data as information to create an even when the wireless connection is disconnected. The session monitoring table 150 may be configured, for example, as depicted in FIG. 28.

The data transmitting and receiving unit 32 includes an upper layer session disconnection monitoring timer value determining unit 152 and a session timer table 154 in addition to the configuration of the second embodiment.

The upper layer session disconnection monitoring timer value determining unit 152 is a functional unit that monitors a disconnection of a communication session, detects the time period from this abortion of the communication to the abandonment of the session, and notifies of this time period. The session timer table 154 has stored therein a session timer value.

In the embodiment, the MS 6 may be configured similarly to that of the second or the third embodiment and, therefore, will no again be described.

According to the configuration including the above BS, the BS 4-1(#1) determines the upper layer session disconnection monitoring timer value during the time period during which the BS 4-1(#1) can communicate with the MS 6. This process is same as that of the second embodiment. When the state control unit 34 of the BS 4-1(#1) detects the drop of the MS 6, the state control unit 34 causes the resource retention timer 38 to start counting and causes the upper layer session disconnection monitoring timer 148 to start counting. The IP address release instruction to the DHCP server 21 is delayed until the timers detect timeouts.

After the resource retention timer 80 detects a timeout, when the MS 6 can establish a reconnection with the base station BS 4-1 until the upper layer session disconnection monitoring timer 78 detects the timeout, the upper layer session disconnection monitoring timer 148 is stopped. As a result, the IP address release is not instructed to the DHCP server 21. In contrast, when the reconnection is not established with the BS 4 within the time period of the upper layer session disconnection monitoring timer 148, the BS 4-1(#1) transmits the IP address release instruction to the DHCP server 21.

By executing the above process, the BS 4 can also avoid the release of the IP address of the network when the counting of the resource retention timer 38 expires, and the MS 6 can also restore the connection even after the counting of the resource retention timer 38 has expired. Therefore, the communication can be continued.

Figure 30:
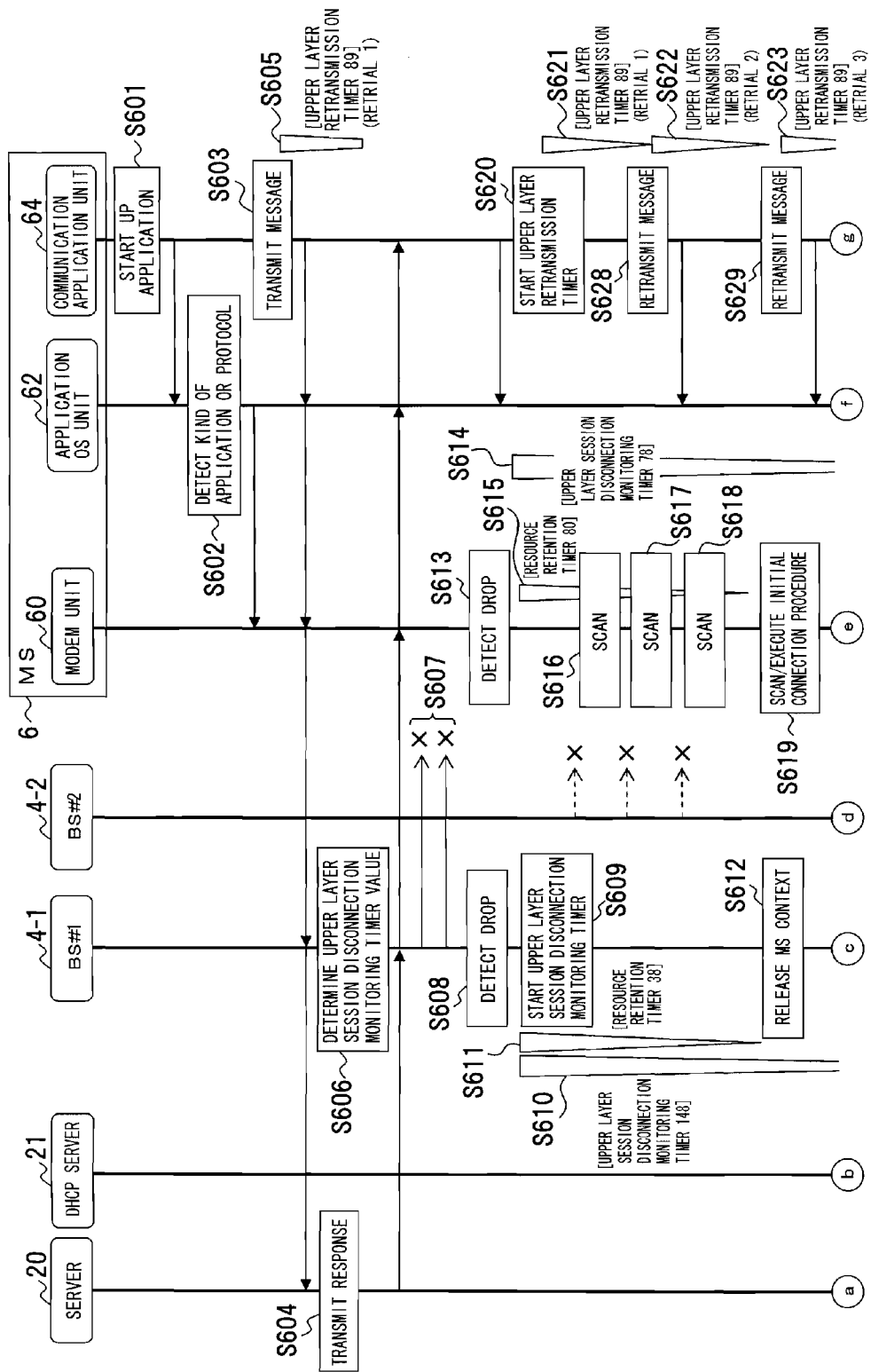
FIG. 30 is a diagram of an operation sequence executed when the connection is successfully restored before a timeout of an upper layer session disconnection monitoring timer.
Figure 31:
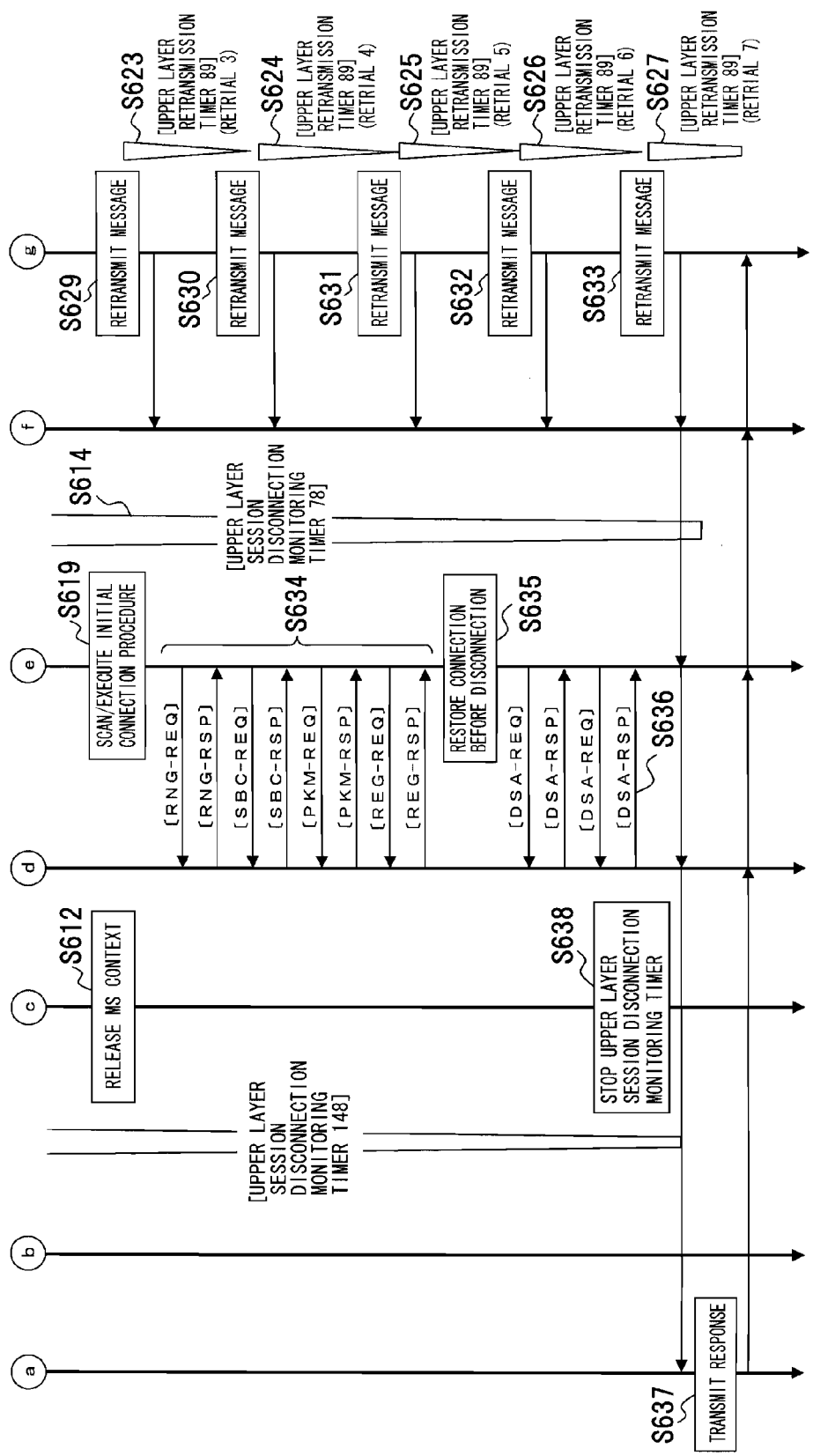
FIG. 31 is a diagram of an operation sequence executed when the connection is successfully restored before the timeout of the upper layer session disconnection monitoring timer.
Figure 32:
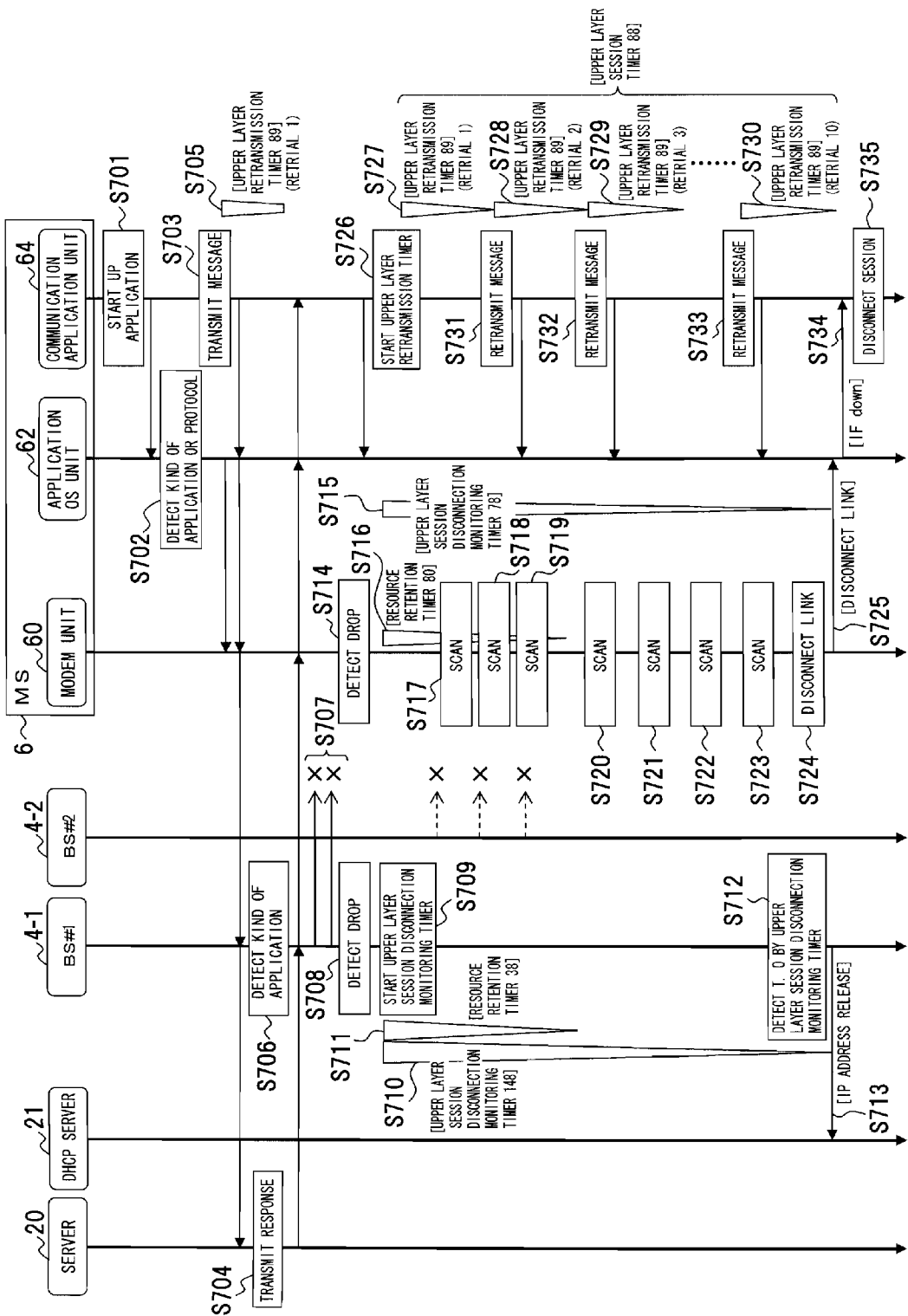
FIG. 32 is a diagram of an operation sequence executed when the connection is unsuccessfully restored before the timeout of the upper layer session disconnection monitoring timer.

The process of restoring the connection will be described with reference to FIGS. 30 to 32. FIGS. 30 and 31 are diagrams of an operation sequence executed when the connection can be restored before the timeout of the upper layer session disconnection monitoring timer. FIG. 32 is a diagram of an operation sequence executed when the connection is not restored before the timeout of the upper layer session disconnection monitoring timer. In FIGS. 30 and 31, "a" to "g" denote the connecting portions between the flowcharts.

(1) The Case where Connection can be Restored Before Timeout of Upper Layer Session Disconnection Monitoring Timer This process includes the connecting process (steps S601 to S605) and this connecting process is same as the process in the second embodiment (step S201 to S205) and, therefore, will not again be described.

The BS 4-1(#1) determines the upper layer session disconnection monitoring timer value within the time period of the communication with the MS 6 (step S606). The connection of the BS 4-1(#1) drops (step S607) and the state control unit 34 detects that the MS 6 has dropped (step S608). After the detection of the drop, the BS 4-1(#1) causes the upper layer session disconnection monitoring timer 148 to start counting (step S609). The upper layer session disconnection monitoring timer 148 starts counting (step S610) and the resource retention timer 38 also starts counting (step S611). After the timeout of the resource retention timer 38, the process of releasing the MS context is executed (step S612), that is, the release of the connection parameter is executed after the timeout of the resource retention timer 38.

In response to the detection of the drop by the BS 4-1 (#1) (step S608), the modem unit 60 causes the upper layer session disconnection monitoring timer 78 to count (step S614) and causes the resource retention timer 80 to count (step S615) after the detection of the drop by the modem unit 60 (step S613). During the counting time period of the resource retention timer 80, following a scanning process (steps S616 to S618), after the expiration of the counting of the resource retention timer 80, the scanning process and the initial connection procedure (step S619) are executed during the counting time period of the upper layer session disconnection monitoring timer 78.

After detecting the drop by the modem unit 60 (step S613), in the communication application unit 64, the upper layer retransmission timer 89 starts counting (step S620). Retrial counting by the upper layer retransmission timer 69 (steps S621 to S627) is executed and retransmission of a message from the communication application unit 64 is executed in seven retrials (steps S628 to S633).

When the BS 4-2(#2) can be found by executing the scanning process, the initial connection procedure (step S619) is shifted to the restoring process and the initial connection procedure (step S634) is executed between the BS 4-2(#2) found and the modem unit 60. In this case, the initial connection procedure referred to as "Initial Network Entry" is executed between the modem unit 60 and the BS 4-2(#2). The modem unit 60 issues RNG-REQ, SBC-REQ, PKM-REQ, and REG-REQ messages. The BS 4-2(#2) issues RNG-RSP, SBC-RSP, PKM-RSP, and REG-RSP messages. Thereby, message exchange is executed.

The initial connection procedure (step S634) transitions to the restoring process to restore the connection state of the link layer. The MS 6 restores the connection created before the disconnection using the connection parameter that the MS 6 has stored therein (step S635). More specifically, the modem unit 60 transmits a DSA-REQ message and the BS 4-2(#2) transmits a DSA-RSP message and, thereby, a connection is created.

When the DSA-RSP arrives at the modem unit 60 (step S636), the communication application unit 64 executes retransmission of the message (step S633) and, thereby, the modem unit 60 notifies the BS 4-2 (#2) of the message received. This message is notified of from the BS 4-2 to the server 20. When the server 20 receives the message, the server 20 executes transmission of a response (step S637). The message transmitted as the response is transferred to the BS 4-2 and arrives at the modem unit 60 from the BS 4-2. The message transmitted as the response is transferred to the communication application unit 64 through the application OS unit 62. In this case, the BS 4-1 (#1) causes the upper layer session disconnection monitoring timer 148 to stop counting (step S638).

In this manner, even after the resource retention time period has elapsed, the communication session can continuously be used when the communication state of the link layer can be restored within the upper layer session retention time period, that is, before the timeout of the upper layer session disconnection monitoring timer 78.

(2) The Case where Connection is not Restored Before Timeout of Upper Layer Session Disconnection Monitoring Timer This process also includes the connecting process (steps S701 to S705) and the connecting process is same as the process (steps S601 to S605), that is, the process executed when the connection can be restored before the timeout of the upper layer session disconnection monitoring timer and, therefore, will not again be described.

The BS 4-1(#1) detects the kind of application and determines the upper layer session disconnection monitoring timer value within the time period for communication with the MS 6 (step S706). The connection of the BS 4-1 (#1) drops (step S707) and the state control unit 34 detects that the MS 6 drops (step S708). After detecting the drop, the BS 4-1 (#1) causes the upper layer session disconnection monitoring timer 148 to start counting (step S709). The upper layer session disconnection monitoring timer 148 counts (step S710) and the resource retention timer 38 also starts counting (step S711). When the upper layer session disconnection monitoring timer 148 detects a timeout (step S712), the BS 4-1(#1) notifies the DHCP server 21 of the instruction to release an IP address (step S713).

Based on the detection of the drop for the BS 4-1 (#1) (step S714), the MS 6 causes the upper layer session disconnection monitoring timer 78 to start counting (step S715) and also causes the resource retention timer 80 to start counting (step S716). After executing the scanning process (steps S717 to S723), the MS 6 executes a process of disconnecting the link due to the expiration of the counting by the upper layer session disconnection monitoring timer 78 (step S724) and instructs to disconnect the link, to the application OS unit 62 (step S725).

Based on the detection of the drop by the modem unit 60 (step S714), the communication application unit 64 causes the upper layer retransmission timer 89 to start counting (step S726) and executes the counting for a plurality of retrials (steps S727 to S730). During this, the communication application unit 64 retransmits a message (steps S731 to S733) and receives a notification of "IF Down" from the application OS unit 62 (step S734) based on the disconnection of the link (step S725) and the session is disconnected (step S735).

Figure 33:
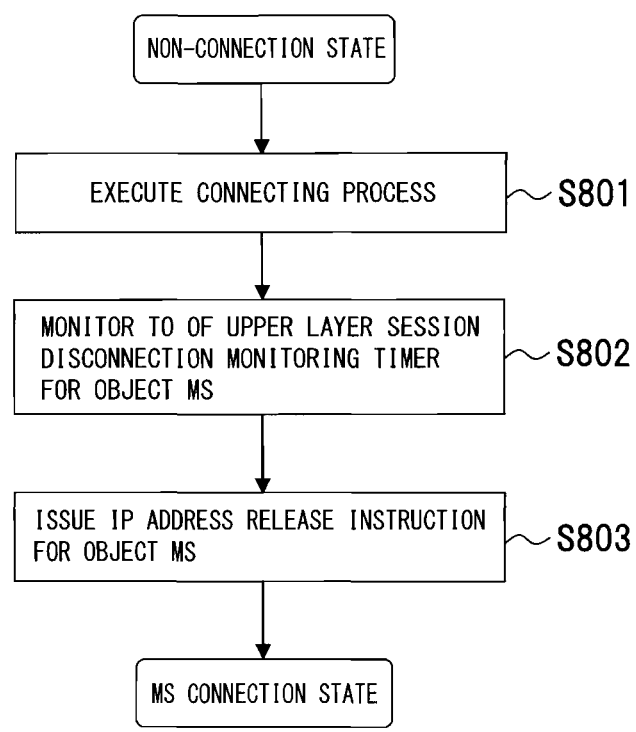
FIG. 33 is a flowchart of a process procedure for transitioning from the non-connection state to the connection state.
Figure 34:
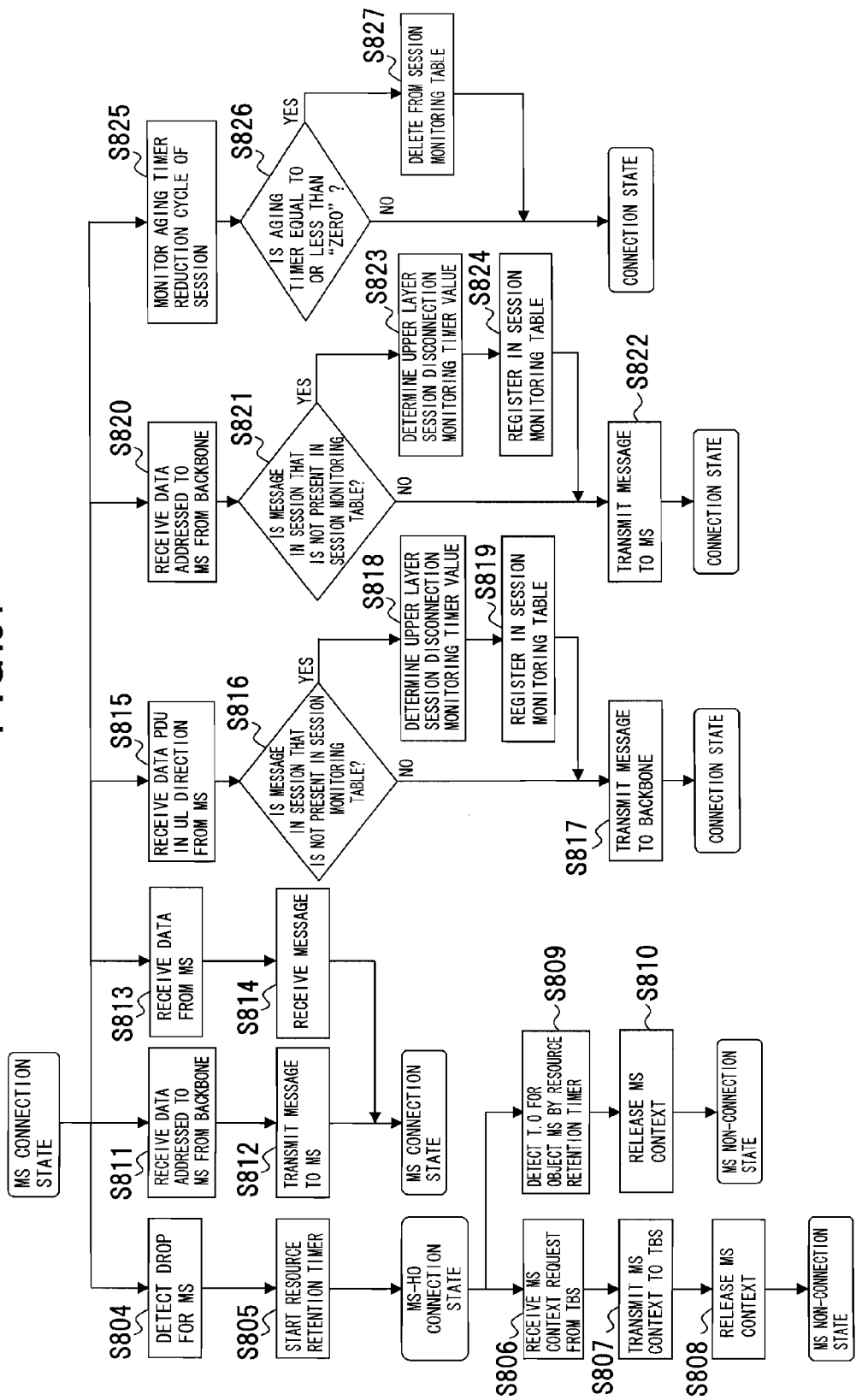
FIG. 34 is a flowchart of an event process for transitioning from the connection state to the non-connection state and the connection state.

Processes by the BS will be described with reference to FIGS. 33 and 34. FIG. 33 is a flowchart of a process procedure of transitioning from the non-connection state to the connection state. FIG. 34 is a flowchart of an event process in the states from the connection state to the non-connection state and the connection state.

As depicted in FIG. 33, the state of the BS 4 transitions from the non-connection state to the connection state by the connecting process (step S801). This connecting process is same as the connecting process (steps S61 to S65: FIG. 18) in the second embodiment and, therefore, will not again be described.

The BS 4 whose state has transitioned to the connection state with the MS 6 monitors the timeout of the upper layer session disconnection monitoring timer for an object MS (step S802) and, after the timeout, the state of the BS 4 transitions to an MS connection state according to the IP address release instruction for the object MS (step S803).

As depicted in FIG. 34, the BS 4 in the connection state causes the resource retention timer 38 to start counting (step S805) in response to the detection of the drop for the MS 6 that is connected thereto (step S804).

In an MS handing over connection state, the BS 4 receives the MS context request from the TBS (step S806), transmits the MS context to the TBS (step S807), and releases the MS context (step S808). Thereby, the state becomes the MS non-connection state. When the resource retention timer 38 detects a timeout for the object MS (step S809), the BS 4 releases the MS context (step S810) and the state becomes the MS non-connection state.

When the BS 4 receives the data addressed to the MS, from the backbone (step S811), the BS 4 transmits a message to the MS 6 (step S812) and the state becomes the MS connection state. When the BS 4 receives data from the MS 6 (step S813), the BS 4 receives a message (step S814) and the state becomes the MS connection state.

The BS 4 in the connection state receives data PDU in the UL direction from the MS 6 (step S815) and determines whether the message is a message in a session that is not present in the session monitoring table 120 (step S816). When the BS 4 determines that the message is not the message of the session (NO of step S816), the BS 4 transmits the message to the backbone (step S817) and maintains the connection state. When the BS 4 determines that the message is the message of the session (YES of step S816), the BS 4 determines the upper layer session disconnection monitoring timer value (step S818) and registers the value in the session monitoring table 120 (step S819) and the procedure transitions to step S817.

The BS 4 in the connection state receives data addressed to the MS, from the backbone (step S820) and determines whether the message is a message in a session that is not present in the session monitoring table 120 (step S821). When the BS 4 determines that the message is not the message of the session (NO of step S821), the BS 4 transmits the message to the MS (step S822) and maintains the connection state.

When the BS 4 determines that the message is the message of the session (YES of step S821), the BS 4 determines the upper layer session disconnection monitoring timer value (step S823) and registers the value in the session monitoring table 120 (step S824) and the procedure transitions to step S822.

The BS 4 monitors the aging timer reduction cycle of the session (step S825) and determines whether the counted value of the aging timer is equal to or less than "zero" (step S826). When the BS 4 determines that the value is not equal to or less than "zero" (NO of step S826), the BS 4 maintains the connection state. When the BS 4 determines that the value is equal to or less than "zero" (YES of step S826), the BS 4 deletes the value from the session monitoring table 120 (step S827) and maintains the connection state.

(3) Comparative Example

Figure 35:
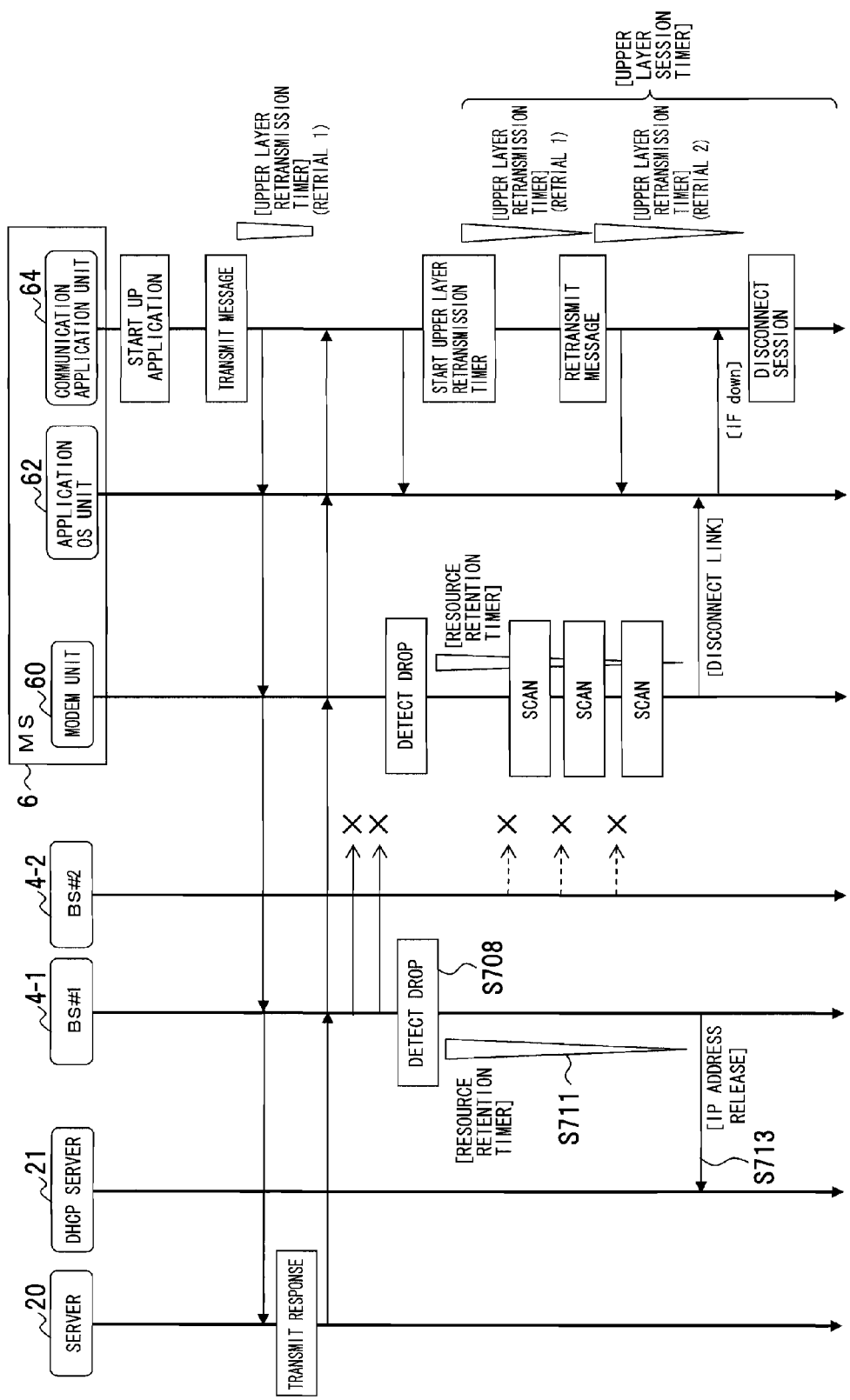
FIG. 35 is a diagram of an operation sequence for a connecting process in a comparative example.

A comparative example will be described with reference to FIG. 35. FIG. 35 is a flowchart of processes by the BS in the comparative example. This example is the case where the BS 4 instructs the DHCP server 21 in the carrier network or the Internet service provider network to release the IP address that is allocated to the MS 6 simultaneously with the timeout of the resource retention timer 38 (steps S708, S711, and S713).

When the BS 4 instructs the DHCP server 21 to release the IP address at the time when the resource retention 38 expires, a problem arises that the MS 6 does not execute IP communication after the time is up for the resource retention timers 38 and 80.

Therefore, the modem unit 60 and the BS 4 each have set therein a configuration to acquire an upper layer application and its upper layer session disconnection monitoring timer value from the header of a packet that passes therethrough. In the configuration, that is, each of the second and the third embodiments, issuance is dynamically changed of the IP address release instruction to the MS 6 by the DHCP server 21 until the upper layer session disconnection monitoring timer 78 detects a timeout. With the configuration, the problem is solved and the restoration of the connection is enabled. Therefore, the configuration is effective.

[e] Other Embodiments (1) In the above embodiments, the mobile is exemplified such as a portable telephone as the MS 6. However, the method, the apparatus, and the system for wireless communication disclosed herein are not limited to the above embodiments. The method, the apparatus, and the system for wireless communication disclosed herein are usable for various electronic devices each include a communication function such as a portable information terminal apparatus 702 (PDA: Personal Digital Assistant, FIG. 36) and a personal computer 704 (PC, FIG. 37).

Figure 36:
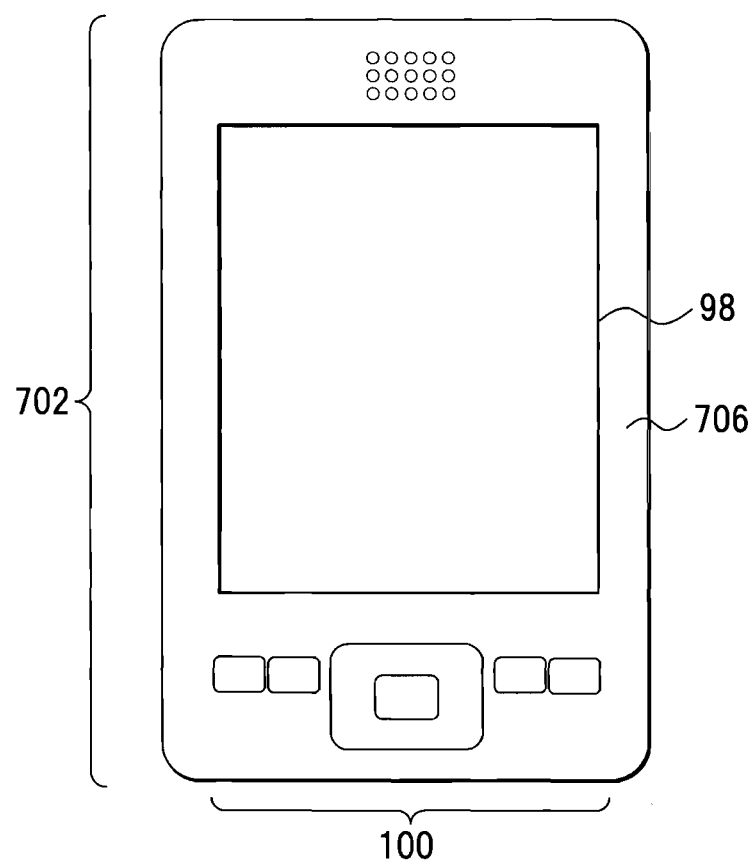
FIG. 36 is a diagram of an example of a portable information terminal device according to another embodiment.

As depicted in FIG. 36, the PDA 702 includes a displaying unit 98 and an input operating unit 100 in a housing unit 706, and may include same functional units as those of the MS 6.

Figure 37:
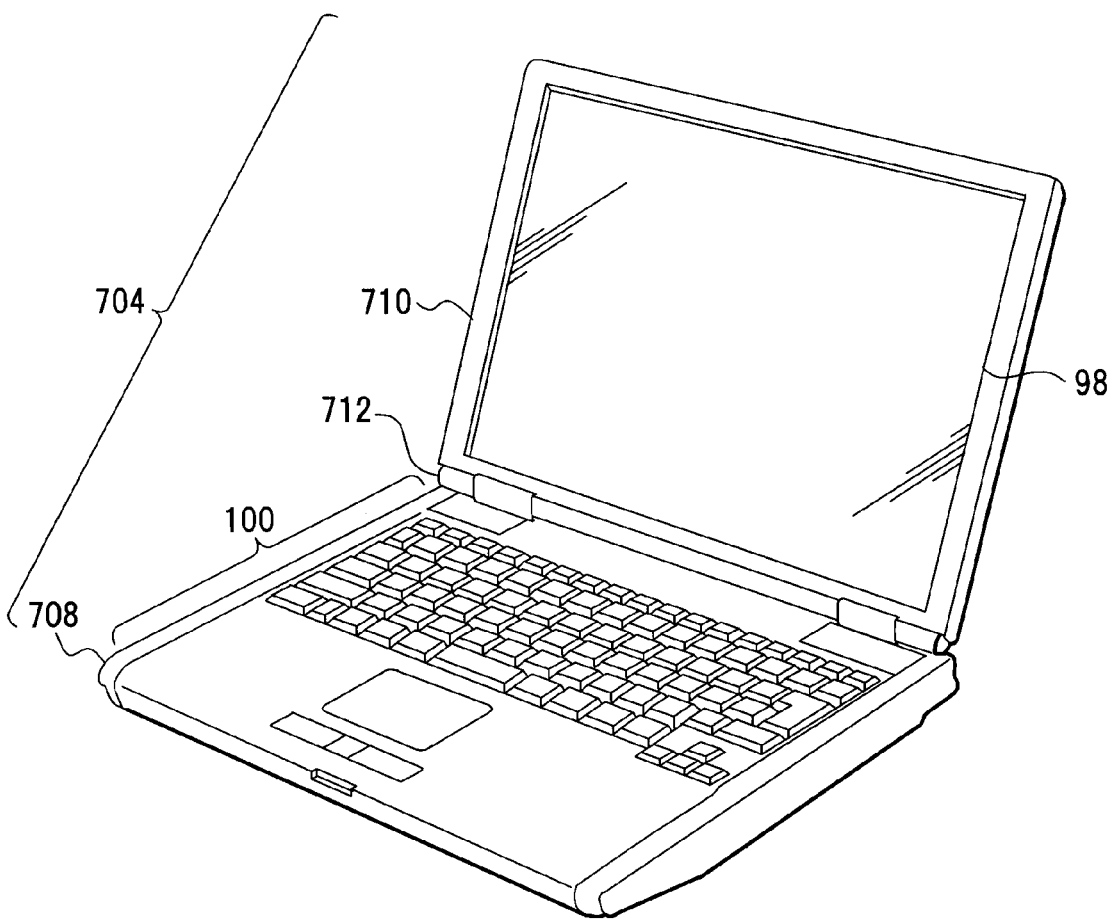
FIG. 37 is a diagram of an example of a personal computer according to another embodiment.

As depicted in FIG. 37, the PC 704 is configured by a first housing unit 708 and a second housing unit 710 to be foldable by a hinging unit 712. The housing unit 708 includes an input operating unit 100 and the housing unit 710 includes a displaying unit 98. The housing unit 708 includes hardware such as the wireless communicating unit 94, the processor 96, the storing unit 102, and a circuit board that configure the functional units.

(2) Though the WiMAX has been exemplified, the communication form of the present invention is not limited to this. The method, the apparatus, and the system for wireless communication disclosed herein are also usable in other communication forms.

(3) In the first embodiment, the configuration has been exemplified for the MS 6 that includes the connection monitoring unit 8, the connection parameter retaining unit 10, and the connection control unit 12. However, the configuration of the present invention is not limited to this. The BS 4 may include the connection monitoring unit 8, the connection parameter retaining unit 10, and the connection control unit 12 as the same configuration.

[f] Comparative Example

A comparative example is an example of the change of the wireless connection.

The comparative example will be described with reference to FIG. 38. FIG. 38 is a diagram of the state of the connection between the base station and the communication terminal device.

As above, in the case where the base stations are not sufficiently installed, that is, for example, in an area having insufficient wireless access networks or a low population covering rate, when the BSs are disposed away from each other, the communication state of an MS repeatedly transitions between those in and out of the coverage and the link layer frequently repeats its connection and its disconnection.

As depicted in FIG. 38, even in the case where the plurality of BSs 401, 402, 403, . . . are installed, when the range of each of the service areas D1, D2, D3, . . . of the BSs 401, 402, 403, . . . is small, the service is limited. In this case, when an MS 600 is moved, the connection state and the disconnection state alternate depending on the position thereof. A message "Disconnected!" may appear and the communication may be disconnected depending on the position.

For the above MS 600, in an ordinary operating system that operates on a PC, etc., the state of the logical interface (IF) is shifted between "up" and "down" corresponding to the connection or the disconnection of the link layer and, when the state of the logical IF is down, all sockets open to the logical IF are closed. The closure of the sockets is recognized as a communication error of the application. Thereafter, even when the link layer is again connected and the state of the logical IF has transitioned to be up, a procedure may be complicated to reconnect as above.

With UCHO, when the synchronization between the BS and the MS stops, the BS retains the resources for a specific time period and the MS can resume the state before the disconnection for the BS found, by executing the network reentry procedure. In general, when the MS is connected to the BS, the MS executes the connection procedure referred to as "network reentry" and exchanges the functional parameter, the connection parameter, authentication information, etc., of the MS (MS context). The "network reentry" executed during the UCHO refers to a procedure for connection without the network reentry procedure, executed when the BS retains the MS context. During UCHO, the BS retains the resources of the MS for a specific time period (resource retention time period) and, when the time period has elapsed, the BS abandons the MS context. Therefore, when the MS can again find the BS after the MS has detected the disconnection from the BS and until the resource retention time period elapses, the MS tries to establish the network reentry for the BS. However, the MS notifies the OS that its position is out of the service area (link layer disconnection) after the resource retention time period has elapsed. As a result, the OS disconnects the application to cause the state of the logical IF to transition to the down state.

The time period for a communication protocol in a layer upper than the network layer to detect a disconnection of the communication due to the timeout is about several minutes and is relatively long. Therefore, in the case where the communication is temporarily aborted, even when the communication can be resumed by the time of the timeout, the communication can continuously be executed by retransmitting from an upper layer. However, when the time period for the BS to retain the MS context is extended matching this, the resource retention time period must be secured to be longer and this leads to an increase of the cost. When the time period for the BS to retain the MS context is shortened, a trading off relation is established that the MS has to disconnect the logical IF even though the upper layer protocol can still continuously be used.

Therefore, the connection state can efficiently be acquired.

According to the method, the apparatus, and the system for wireless connection of the above embodiments, the following effects are obtained.

(1) In addition to the reconnection within the connection parameter retention time period of the base station, the connection can be restored using the connection parameter retained when the connection is disconnected within the communication session retention time period that exceeds the connection parameter retention time period. Therefore, a connecting function for wireless connection can be improved.

(2) The connection parameter retained when the connection is disconnected is retained by the base station or the communication terminal device and is used for restoration of the wireless connection. Therefore, expediting of a connection process can be facilitated.

(3) The base station or the communication terminal device retains within the communication session retention time period the connection parameter retained when the connection is disconnected. Therefore, the load for retaining the resources such as the connection parameter can be reduced.

Technical ideas extracted from the embodiments including the example described above will then be listed. The technical ideas of the present disclosure may be comprehended at various levels and variations ranging from higher to lower conceptions and the present invention is not limited to the following description.

A wireless connecting method to connect a communication terminal device with a base station by wireless includes monitoring the wireless connection between the communication terminal device and the base station; setting a communication session retention time period that is longer than a connection parameter retention time period during which a connection parameter for a wireless connection is retained and a reconnecting process is executable, and retaining a connection parameter stored when a wireless connection is disconnected, in at least one of the communication terminal device and the base station for the communication session retention time period exceeding the connection parameter retention time period; and after the connection parameter retention time period has elapsed, when the communication session retention time period has not elapsed, restoring the connection using the connection parameter stored when the connection is disconnected by executing an initial connecting process.

The above wireless connecting method may preferably include executing by the communication terminal device a scanning process within the connection parameter retention time period or the communication session retention time period after the disconnection of the wireless connection.

The above wireless connecting method may preferably include acquiring another connection parameter of another base station from the base station connected thereto before the disconnection, wherein when the other connection parameter is acquired, the initial connecting process is executed without acquisition of the other connection parameter after the disconnection.

The above wireless connecting method may preferably include dynamically determining a communication application by judging a kind of the communication application from a port number used by the communication application in an active state.

The above wireless connecting method may preferably include dynamically determining the communication session retention time period from a communication packet.

The above wireless connecting method may preferably include deleting a network address after the base station deletes the connection parameter of the communication terminal device, wherein the deletion of the network address is delayed until the communication session retention time period elapses.

A wireless connecting apparatus for connecting a communication terminal device with a base station by wireless includes a connection monitoring unit that monitors the wireless connection; a connection parameter retaining unit that retains a connection parameter stored when the wireless connection is disconnected for a communication session retention time period exceeding a connection parameter retention time period, the communication session retention time period being set to be longer than the connection parameter retention time period, the connection parameter retention time period being a time period during which the connection parameter for the wireless connection is retained and a reconnecting process is executable; and a connection control unit that, after the connection parameter retention time period has elapsed, when the communication session retention time period has not elapsed, restores the connection using the connection parameter stored when the connection is disconnected by executing an initial connecting process.

In the above wireless connecting apparatus, preferably, after the wireless connection is disconnected, the connection control unit may execute a scanning process within the connection parameter retention time period or the communication session retention time period.

In the above wireless connecting apparatus, preferably, the connection control unit may acquire another connection parameter of another base station from the base station connected thereto before the disconnection and, when the other connection parameter is acquired, the initial connecting process is executed without acquisition of the other connection parameter after the disconnection.

In the above wireless connecting apparatus, preferably, the connection control unit may dynamically determine a communication application by judging a kind of the communication application from a port number used by the communication application in an active state.

In the above wireless connecting apparatus, preferably, the connection control unit may dynamically determine the communication session retention time period from a communication packet.

In the wireless connecting apparatus, preferably, after the base station deletes the connection parameter of the communication terminal device, a network address may be deleted, and the deletion of the network address may be delayed until the communication session retention time period elapses.

A wireless connection system to connect a communication terminal device with a base station by wireless includes in at least one of the communication terminal device and the base station: a connection monitoring unit that monitors the wireless connection; a connection parameter retaining unit that retains a connection parameter stored when the wireless connection is disconnected for a communication session retention time period exceeding a connection parameter retention time period, the communication session retention time period being set to be longer than the connection parameter retention time period, the connection parameter retention time period being a time period during which the connection parameter for the wireless connection is retained and a reconnecting process is executable; and a connection control unit that, after the connection parameter retention time period has elapsed, when the communication session retention time period has not elapsed, restores the connection using the connection parameter stored when the connection is disconnected by executing an initial connecting process.

The above wireless connection system may preferably include the above wireless connecting apparatus.

The program implementing the embodiments may be recorded on computer-readable media comprising computer-readable recording media. The program implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

While the embodiments of a method, an apparatus and a system for wireless connection have been described hereinabove, the present invention is not limited to the above embodiments, and it is a matter of course that various variations and modifications can be made by those skilled in the art within the scope of the claims without departing from the spirit of the invention disclosed herein, and needless to say, such variations and modifications are also encompassed in the scope of the present invention.

What is claimed is:

1. A method for connecting a communication terminal device with a base station by wireless, the method comprising:
    monitoring the wireless connection between the communication terminal device and the base station;
    setting a communication session retention time period that is longer than a connection parameter retention time period during which a connection parameter is retained and a reconnecting process is executable, the connection parameter being for connecting the communication terminal device with the base station by wireless, and retaining the connection parameter, which is stored when the wireless connection is disconnected, in at least one of the communication terminal device and the base station for the communication session retention time period over the connection parameter retention time period;
    acquiring another connection parameter of another base station from the base station connected to the communication terminal device before the disconnection; and
    after the connection parameter retention time period has elapsed, and while the communication session retention time period has not elapsed, restoring the wireless connection using the connection parameter, which is stored when the wireless connection is disconnected, by executing an initial connecting process using said another connection parameter.

2. The method of claim 1, further comprising:
    executing by the communication terminal device a scanning process within the connection parameter retention time period or the communication session retention time period after the disconnection of the wireless connection.

3. The method of claim 1, further comprising:
    dynamically determining a communication application by judging a kind of the communication application from a port number used by the communication application in an active state.

4. The method of claim 1, further comprising:
    dynamically determining the communication session retention time period from a communication packet.

5. A method for connecting a communication terminal device with a base station by wireless, the method comprising:
    monitoring the wireless connection between the communication terminal device and the base station;
    setting a communication session retention time period that is longer than a connection parameter retention time period during which a connection parameter for the wireless connection is retained and a reconnecting process is executable, and retaining the connection parameter, which is stored when the wireless connection is disconnected, in at least one of the communication terminal device and the base station for the communication session retention time period over the connection parameter retention time period;
    after the connection parameter retention time period has elapsed, and while the communication session retention time period has not elapsed, restoring the wireless connection using the connection parameter, which is stored when the wireless connection is disconnected, by executing an initial connecting process; and
    acquiring another connection parameter of another base station from the base station connected to the communication terminal device before the disconnection, wherein
    when the other connection parameter is acquired, the initial connecting process is executed without acquisition of the other connection parameter after the disconnection.

6. A method for connecting a communication terminal device with a base station by wireless, the method comprising:
    monitoring the wireless connection between the communication terminal device and the base station;
    setting a communication session retention time period that is longer than a connection parameter retention time period during which a connection parameter for the wireless connection is retained and a reconnecting process is executable, and retaining the connection parameter, which is stored when the wireless connection is disconnected, in at least one of the communication terminal device and the base station for the communication session retention time period over the connection parameter retention time period;
    after the connection parameter retention time period has elapsed, and while the communication session retention time period has not elapsed, restoring the wireless connection using the connection parameter, which is stored when the wireless connection is disconnected, by executing an initial connecting process; and
    deleting a network address after the base station deletes the connection parameter of the communication terminal device, wherein
    the deletion of the network address is delayed until the communication session retention time period elapses.

7. A wirelessly connecting apparatus for connecting a communication terminal device with a base station by wireless, the wirelessly connecting apparatus comprising:
    a connection monitoring unit that monitors the wireless connection;
    a connection parameter retaining unit that retains a connection parameter stored when the wireless connection is disconnected for a communication session retention time period over a connection parameter retention time period, the connection parameter being for connecting the communication terminal device with the base station by wireless, the communication session retention time period being set to be longer than the connection parameter retention time period, the connection parameter retention time period being a time period during which the connection parameter is retained and a reconnecting process is executable; and
a connection control unit that acquires another connection parameter of another base station from the base station connected to the communication terminal device before the disconnection, after the connection parameter retention time period has elapsed, and while the communication session retention time period has not elapsed, restores the wireless connection using the connection parameter stored when the wireless connection is disconnected by executing an initial connecting process using said another connection parameter.

8. The wirelessly connecting apparatus of claim 7, wherein after the wireless connection is disconnected, the connection control unit executes a scanning process within the connection parameter retention time period or the communication session retention time period.

9. The wirelessly connecting apparatus of claim 7, wherein the connection control unit dynamically determines a communication application by judging a kind of the communication application from a port number used by the communication application in an active state.

10. The wirelessly connecting apparatus of claim 7, wherein
the connection control unit dynamically determines the communication session retention time period from a communication packet.

11. A wirelessly connecting apparatus for connecting a communication terminal device with a base station by wireless, the wirelessly connecting apparatus comprising:
a connection monitoring unit that monitors the wireless connection;
a connection parameter retaining unit that retains a connection parameter stored when the wireless connection is disconnected for a communication session retention time period over a connection parameter retention time period, the communication session retention time period being set to be longer than the connection parameter retention time period, the connection parameter retention time period being a time period during which the connection parameter for the wireless connection is retained and a reconnecting process is executable; and
a connection control unit that, after the connection parameter retention time period has elapsed, and while the communication session retention time period has not elapsed, restores the wireless connection using the connection parameter stored when the wireless connection is disconnected by executing an initial connecting process,
wherein the connection control unit acquires another connection parameter of another base station from the base station connected to the communication terminal device before the disconnection and, when the other connection parameter is acquired, the initial connecting process is executed without acquisition of the other connection parameter after the disconnection.

12. A wirelessly connecting apparatus for connecting a communication terminal device with a base station by wireless, the wirelessly connecting apparatus comprising:
a connection monitoring unit that monitors the wireless connection;
a connection parameter retaining unit that retains a connection parameter stored when the wireless connection is disconnected for a communication session retention time period over a connection parameter retention time period, the communication session retention time period being set to be longer than the connection parameter retention time period, the connection parameter retention time period being a time period during which the connection parameter for the wireless connection is retained and a reconnecting process is executable; and
a connection control unit that, after the connection parameter retention time period has elapsed, and while the communication session retention time period has not elapsed, restores the wireless connection using the connection parameter stored when the wireless connection is disconnected by executing an initial connecting process,
wherein after the base station deletes the connection parameter of the communication terminal device, a network address is deleted, and wherein
the deletion of the network address is delayed until the communication session retention time period elapses.

13. A wireless connection system for connecting a communication terminal device with a base station by wireless, the wireless connection system comprising in at least one of the communication terminal device and the base station:
a connection parameter retaining unit that retains a connection parameter stored when the wireless connection is disconnected for a communication session retention time period over a connection parameter retention time period, the connection parameter being for connecting the communication terminal device with the base station by wireless, the communication session retention time period being set to be longer than the connection parameter retention time period, the connection parameter retention time period being a time period during which the connection parameter is retained and a reconnecting process is executable;
a connection monitoring unit that monitors the wireless connection; and
a connection control unit that acquires another connection parameter of another base station from the base station connected to the communication terminal device before the disconnection, after the connection parameter retention time period has elapsed, and while the communication session retention time period has not elapsed, restores the wireless connection using the connection parameter stored when the wireless connection is disconnected by executing an initial connecting process using said another connection parameter.

14. The wireless connection system of claim 13, wherein after the wireless connection is disconnected, the connection control unit executes a scanning process within the connection parameter retention time period or the communication session retention time period.

15. The wireless connection system of claim 13, wherein the connection control unit dynamically determines a communication application by judging a kind of the communication application from a port number used by the communication application in an active state.

16. The wireless connection system of claim 13, wherein the connection control unit dynamically determines the communication session retention time period from a communication packet.

17. A wireless connection system for connecting a communication terminal device with a base station by wireless, the wireless connection system comprising in at least one of the communication terminal device and the base station:

a connection monitoring unit that monitors the wireless connection;

a connection parameter retaining unit that retains a connection parameter stored when the wireless connection is disconnected for a communication session retention time period over a connection parameter retention time period, the communication session retention time period being set to be longer than the connection parameter retention time period, the connection parameter retention time period being a time period during which the connection parameter for the wireless connection is retained and a reconnecting process is executable; and a connection control unit that, after the connection parameter retention time period has elapsed, and while the communication session retention time period has not elapsed, restores the wireless connection using the connection parameter stored when the wireless connection is disconnected by executing an initial connecting process, wherein the connection control unit acquires another connection parameter of another base station from the base station connected to the communication terminal device before the disconnection and, when the other connection parameter is acquired, the initial connecting process is executed without acquisition of the other connection parameter after the disconnection.

18. A wireless connection system for connecting a communication terminal device with a base station by wireless, the wireless connection system comprising in at least one of the communication terminal device and the base station:

a connection monitoring unit that monitors the wireless connection;

a connection parameter retaining unit that retains a connection parameter stored when the wireless connection is disconnected for a communication session retention time period over a connection parameter retention time period, the communication session retention time period being set to be longer than the connection parameter retention time period, the connection parameter retention time period being a time period during which the connection parameter for the wireless connection is retained and a reconnecting process is executable; and a connection control unit that, after the connection parameter retention time period has elapsed, and while the communication session retention time period has not elapsed, restores the wireless connection using the connection parameter stored when the wireless connection is disconnected by executing an initial connecting process, wherein after the base station deletes the connection parameter of the communication terminal device, a network address is deleted, and wherein the deletion of the network address is delayed until the communication session retention time period elapses.

* * * * *